(12) United States Patent
Wells et al.

(10) Patent No.: US 7,568,737 B2
(45) Date of Patent: *Aug. 4, 2009

(54) MALE COUPLING FOR CONNECTING TO FEMALE THREADED COUPLING

(75) Inventors: Michael P. Wells, Bowling Green, OH (US); Todd Jerome Vogel, Waterville, OH (US)

(73) Assignee: Eaton Corporation, Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 11/860,518

(22) Filed: Sep. 24, 2007

(65) Prior Publication Data

US 2008/0073911 A1 Mar. 27, 2008

Related U.S. Application Data

(60) Provisional application No. 60/912,052, filed on Apr. 16, 2007, provisional application No. 60/826,701, filed on Sep. 22, 2006.

(51) Int. Cl.
*F16L 37/10* (2006.01)
*F16L 37/138* (2006.01)

(52) U.S. Cl. .......................... 285/391; 285/34; 285/86; 285/89

(58) Field of Classification Search ............... 285/34, 285/35, 86, 89, 92, 391
See application file for complete search history.

(56) References Cited

U.S. PATENT DOCUMENTS

| | | | | |
|---|---|---|---|---|
| 1,916,284 A | * | 7/1933 | Ragan | 285/35 |
| 2,813,567 A | * | 11/1957 | Williams | 152/415 |
| 3,039,794 A | * | 6/1962 | De Cenzo | 137/614.03 |
| 3,159,075 A | | 12/1964 | Bjork | |
| 4,066,282 A | | 1/1978 | Vann | |
| 4,396,061 A | * | 8/1983 | Tamplen et al. | 166/217 |
| 4,433,859 A | * | 2/1984 | Driver et al. | 285/34 |
| 5,634,754 A | | 6/1997 | Weddendorf | |
| 5,649,723 A | * | 7/1997 | Larsson | 285/34 |
| 5,788,443 A | | 8/1998 | Cabahug | |
| 5,996,654 A | | 12/1999 | Green | |
| 6,443,496 B2 | | 9/2002 | Campau | |
| 6,964,435 B2 | | 11/2005 | Wolf et al. | |
| 7,032,932 B2 | * | 4/2006 | Guest | 285/92 |
| 7,108,296 B2 | | 9/2006 | Andre | |
| 2004/0070197 A1 | | 4/2004 | Densel et al. | |

OTHER PUBLICATIONS

Faster News; Pressure Tight Connections; Jun. 2006.
International Search Report and Written Opinion of the International Searching Authority; Authorized Officer: Hewitt, James M.; Oct. 6, 2008.
www.faster.it; Think Faster, Quick-Release Couplings and Multiconnections; Date unknown, copy submitted as existed in Aug. 2007.

* cited by examiner

*Primary Examiner*—James M Hewitt
(74) *Attorney, Agent, or Firm*—Benesch, Friedlander, Coplan & Aronoff LLP

(57) ABSTRACT

A male coupling is connectable to and separable from a female threaded coupling. The female threaded coupling includes a sealing surface and a receiving portion sized to receive at least a portion of the male coupling, where the receiving portion has internal threads provided therein. The male coupling includes a body having a passageway extending therethrough and a locking member disposed about the body and configured to move between locking and releasing positions. The locking member has a retaining formation configured to engage the internal threads of the female threaded coupling when the locking member is in its locking position. After insertion of the male coupling into the female threaded coupling, the retaining formation of the locking member engages one or more of the internal threads in the female threaded coupling when the locking member is in its locking position.

24 Claims, 18 Drawing Sheets

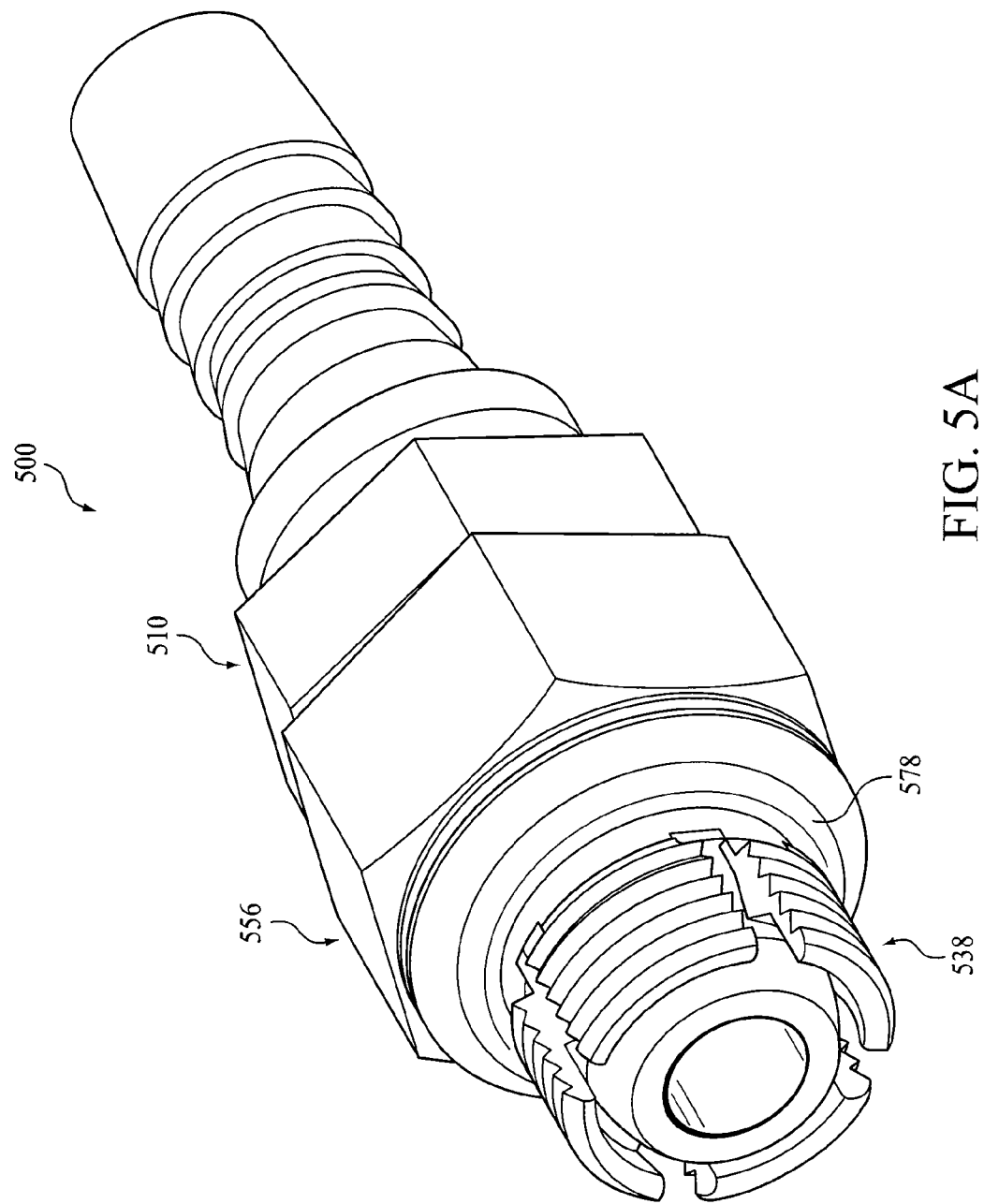

MALE COUPLING FOR CONNECTING TO FEMALE THREADED COUPLING

CROSS-REFERENCE TO RELATED APPLICATIONS

This application claims priority to U.S. Provisional Application No. 60/826,701 filed on Sep. 22, 2006 and U.S. Provisional Application No. 60/912,052 filed on Apr. 16, 2007, the disclosures of which are hereby incorporated by reference in their entireties herein.

BACKGROUND

1. Field of the Invention

The present application relates to fluid couplings and, more particularly, to fluid couplings that are configured to connect to a female threaded coupling.

2. Description of the Related Art

Coupling assemblies for the transmission of gases or fluids that may be secured together by axial movement of a male coupling into a female coupling are known in the art. In a typical application, a male coupling and a female coupling function as an adapter between a flexible conduit, such as a hose, and an apparatus, such as a pump. While several methods are commonly used to connect the male coupling to the flexible conduit, such as a barbed hose adapter, the female coupling is typically connected to a standard female threaded port in the apparatus.

Manufacturers of coupling assemblies have attempted to reduce complexity and cost by integrating the female coupling directly into their customer's apparatus (known as "direct porting"), thereby eliminating the need for the standard female threaded port. However, customers are oftentimes reluctant to integrate a particular coupling manufacturer's female coupling directly into their apparatus because doing so would make it difficult to convert back to a standard female threaded port. Additionally, customers may be reluctant to integrate a particular manufacturer's female coupling directly into the apparatus because doing so would require them to purchase all their replacement hoses from the coupling manufacturer. There are continual efforts to improve upon the current designs of coupling assemblies, particularly to reduce the complexity and cost of coupling assemblies as well as to design couplings that are compatible with standard fittings (e.g., a standard female threaded port).

SUMMARY

In one embodiment, a male coupling that is connectable to and separable from a female threaded coupling (e.g., a female threaded port) is provided. The female threaded coupling includes a sealing surface and a receiving portion sized to receive at least a portion of the male coupling, where the receiving portion has internal threads provided therein. The male coupling includes a body having a passageway extending therethrough and a locking member (e.g., ratcheting or non-ratcheting) disposed about the body and configured to move between locking and releasing positions. The locking member has a retaining formation (e.g., a partial threaded formation) configured to engage the internal threads of the female threaded coupling when the locking member is in its locking position. The male coupling also includes an axially movable sleeve disposed about the body and an annular seal disposed about the sleeve. After insertion of the male coupling into the female threaded coupling, the retaining formation of the locking member engages one or more of the internal threads in the female threaded coupling when the locking member is in its locking position. Upon movement of the sleeve towards the female threaded coupling, the annular seal is compressed against the sealing surface of the female threaded coupling.

In another embodiment, a male coupling that is connectable to and separable from a female threaded coupling (e.g., a female threaded port) is provided. The female threaded coupling includes a sealing surface and a receiving portion sized to receive at least a portion of the male coupling, where the receiving portion has internal threads provided therein. The male coupling includes a body having a passageway extending therethrough and a ratcheting locking member (e.g., a number of segments or a unitary locking member having resilient fingers) disposed about the body and configured to move between locking and releasing positions. The ratcheting locking member has a retaining formation (e.g., a partial threaded formation) configured to engage the internal threads of the female threaded coupling when the locking member is in its locking position. The male coupling also includes a movable sleeve disposed about the body and an annular seal disposed about the sleeve. Upon insertion of the male coupling into the female threaded coupling, the retaining formation of the ratcheting locking member progressively engages the internal threads in the female threaded coupling. Upon axial movement of the sleeve towards the female threaded coupling, the annular seal is compressed against the sealing surface of the female threaded coupling.

In another embodiment, a male coupling that is connectable to and separable from a female threaded coupling (e.g., a female threaded port) is provided. The female threaded coupling includes a sealing surface and a receiving portion sized to receive at least a portion of the male coupling, where the receiving portion has internal threads provided therein. The male coupling includes a body having external threads and a passageway extending therethrough, and a ratcheting locking member disposed about the body and having a number of resilient fingers configured to move between locking and releasing positions. Each resilient finger has a retaining formation (e.g., a partial threaded formation) configured to engage the internal threads of the female threaded coupling when the resilient fingers are in their respective locking positions. The male coupling also includes a nut having internal threads threadingly engaged to the external threads of the body and an annular seal disposed about the nut. Upon insertion of the male coupling into the female threaded coupling, the retaining formation of each resilient finger progressively engages the internal threads in the female threaded coupling. Upon rotation of the nut, the male coupling is drawn closer to the female threaded coupling, thereby compressing the annular seal against the sealing surface of the female threaded coupling.

In another embodiment, a male coupling that is connectable to and separable from a female threaded coupling (e.g., a female threaded port) is provided. The female threaded coupling includes a sealing surface and a receiving portion sized to receive at least a portion of the male coupling, where the receiving portion has internal threads provided therein. The male coupling includes a body and a ratcheting locking member (e.g., a number of segments or a unitary locking member having resilient fingers) disposed about the body and configured to move between locking and releasing positions. The ratcheting locking member has a retaining formation (e.g., a partial threaded formation) configured to engage the internal threads of the female threaded coupling. The male coupling also includes a sleeve disposed about the body and in engagement with the ratcheting locking member, such that rotation of the sleeve causes rotation of the ratcheting locking member. Upon insertion of the male coupling into the female threaded coupling, the retaining formation of the ratcheting locking member progressively engages the internal threads in the female threaded coupling. Upon rotation of the sleeve, the ratcheting locking member rotates relative to the body, thereby drawing the male coupling towards the female threaded coupling.

A method of sealingly connecting a male coupling to a female threaded coupling (e.g., a female threaded port) is provided. The female threaded coupling includes a sealing surface and a receiving portion sized to receive at least a portion of the male coupling, wherein the receiving portion has internal threads provided therein. The method includes the steps of: providing a male coupling that includes a body having a passageway extending therethrough, a locking member disposed about the body and having a retaining formation configured to engage the internal threads of the female threaded coupling when the locking member is in a locking position, a sleeve disposed about the body, and an annular seal disposed about the sleeve; inserting the male coupling into the female threaded coupling until the retaining formation of the locking member engages the internal threads in the female threaded coupling; and moving the sleeve towards the female threaded coupling to compress the annular seal against the sealing surface of the female threaded coupling.

BRIEF DESCRIPTION OF THE DRAWINGS

It will be appreciated that the illustrated boundaries of elements in the drawings represent only one example of the boundaries. One of ordinary skill in the art will appreciate that a single element may be designed as multiple elements or that multiple elements may be designed as a single element. An element shown as an internal feature may be implemented as an external feature and vice versa.

Further, in the accompanying drawings and description that follow, like parts are indicated throughout the drawings and description with the same reference numerals, respectively. The drawings may not be drawn to scale and the proportions of certain elements have been exaggerated for convenience of illustration.

FIGS. 5A and 5B illustrate perspective and cross-sectional views, respectively, of another embodiment of a male coupling 500 configured for connection to a female threaded coupling.

DETAILED DESCRIPTION

Figure 1A:
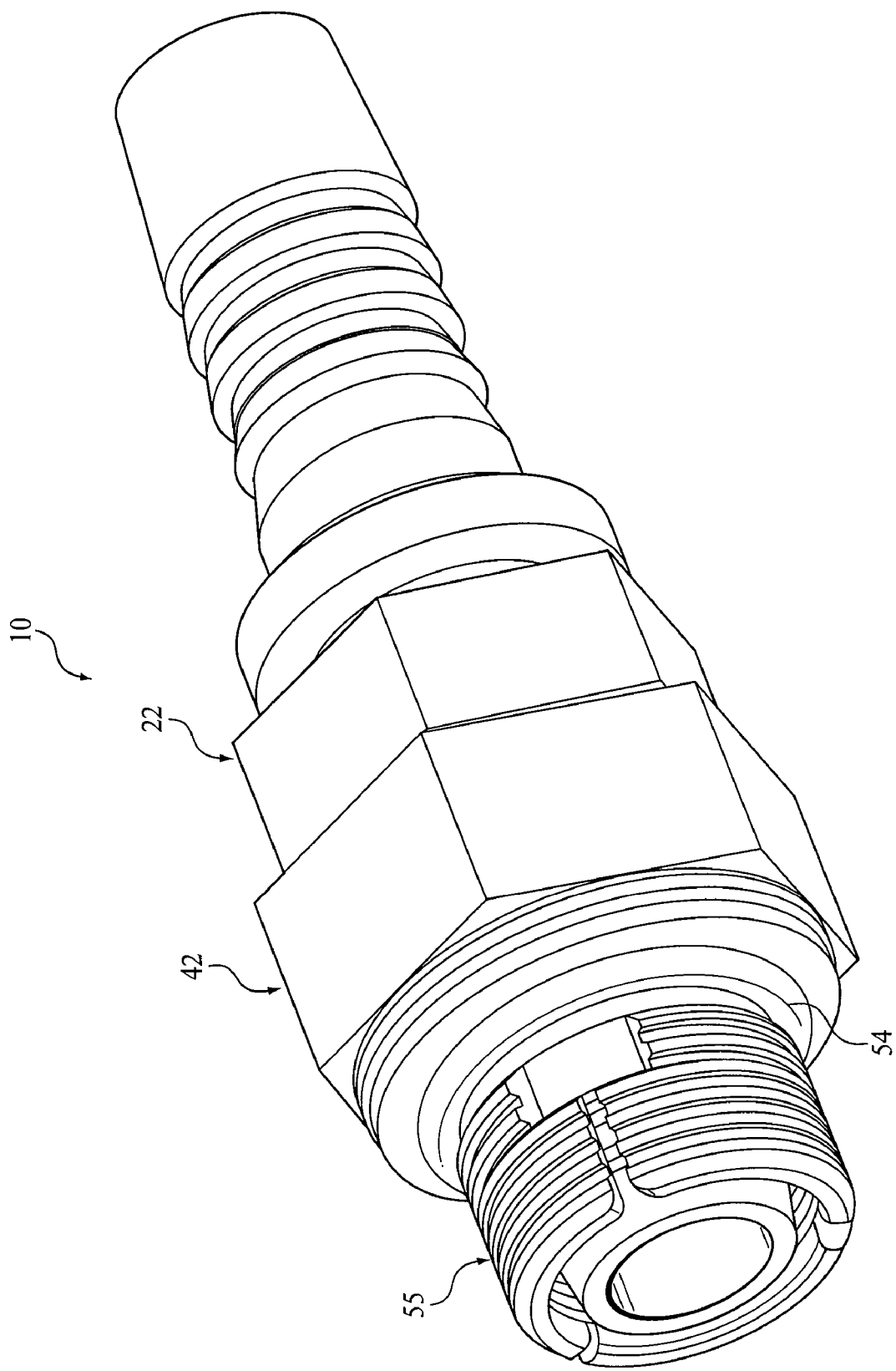
FIG. 1A illustrates a perspective view of one embodiment of a male coupling 10 for connection to a female threaded coupling.

Certain terminology will be used in the following description for convenience in reference only and will not be limiting. The terms "forward" and "rearward" with respect to each component of the coupling assembly will refer to directions towards and away from, respectively, the coupling direction. The terms "rightward" and "leftward" will refer to directions in the drawings in connection with which the terminology is used. The terms "inwardly" and "outwardly" will refer to directions toward and away from, respectively, the geometric centerline or longitudinal axis of the coupling assembly. The terms "upward" and "downward" will refer to directions as taken in the drawings in connection with which the terminology is used. All of the foregoing terms include the normal derivative and equivalents thereof.

Figure 1B:
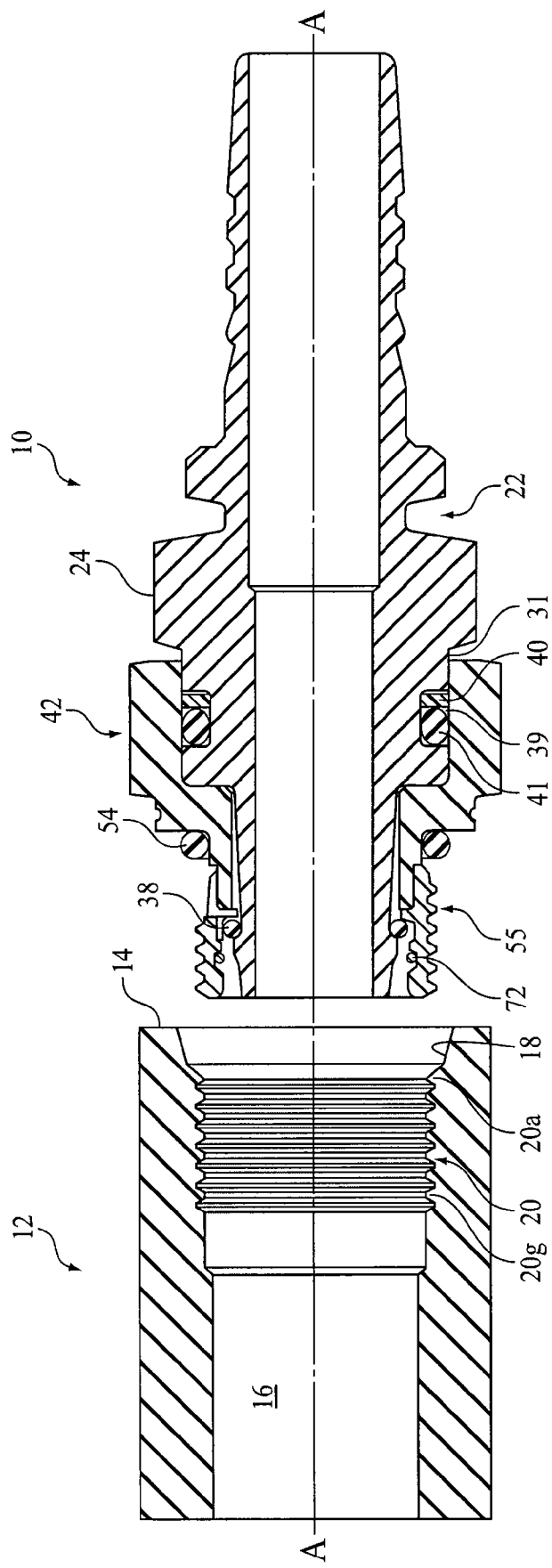
FIGS. 1B and 1C illustrate cross-sectional views of the male coupling 10 in its uncoupled and coupled positions, respectively, relative to a female threaded coupling 12.

Illustrated in FIGS. 1A and 1B are perspective and cross-sectional views, respectively, of one embodiment of a male coupling 10 configured to be coupled to and separable from a female threaded coupling 12. Together, the male coupling 10 and the female threaded coupling 12 operate as a push-to-connect type coupling assembly, which will be discussed in further detail below. As shown in FIG. 1B, the male coupling 10 and the female threaded coupling 12 are in an uncoupled position. In the illustrated embodiment, the female threaded coupling 12 is a female threaded port, such as a standard female threaded port. In one embodiment, the standard female threaded port can be an SAE O-ring boss port. In alternative embodiments, the standard female threaded port can be ISO, DIN or BSPP O-ring ports.

Figure 1C:
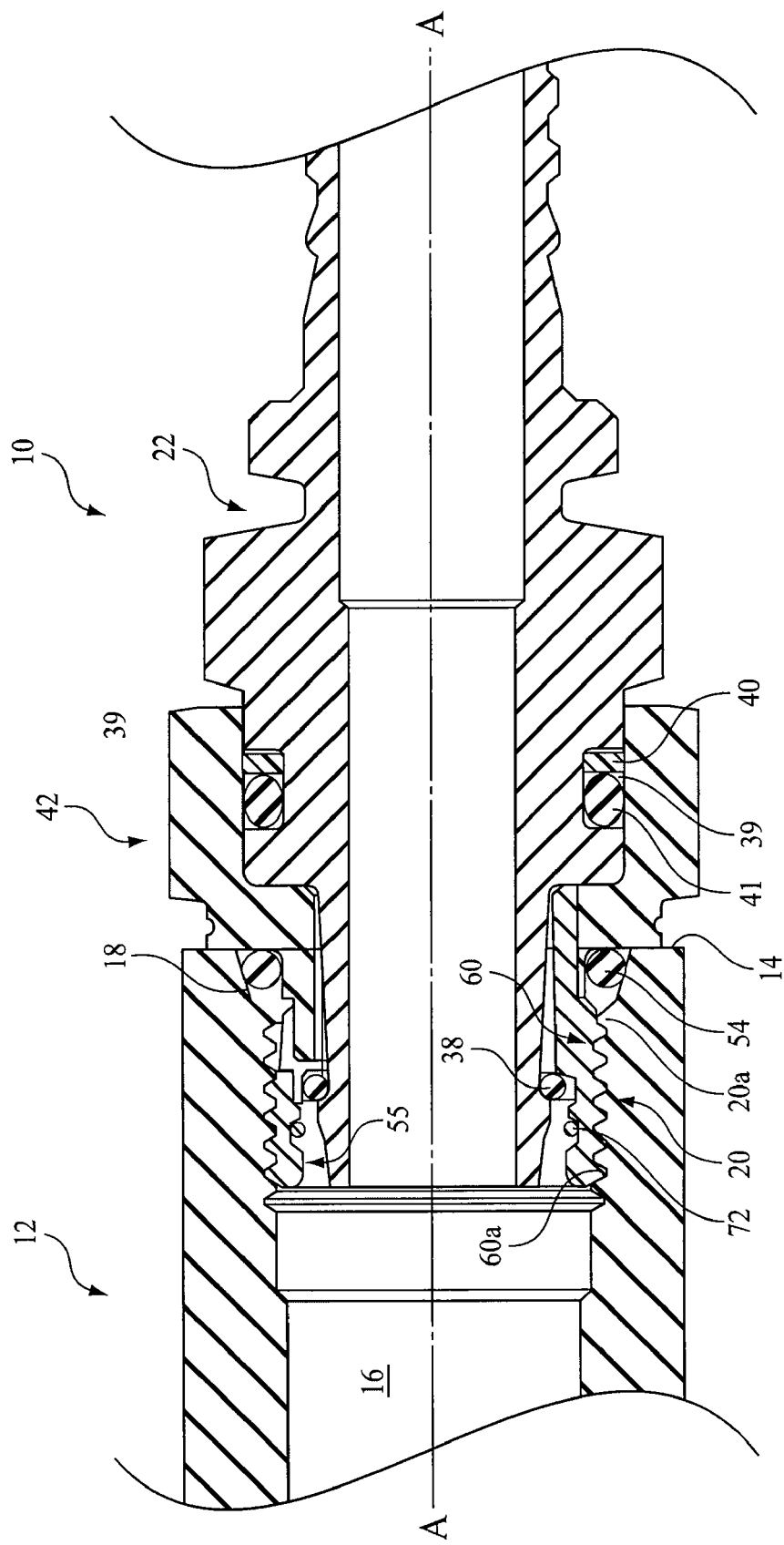

Illustrated in FIG. 1C is a cross-sectional view of the male coupling 10 and the female threaded coupling 12 in a coupled position. In the coupled position, the male coupling 10 and the female threaded coupling 12 function as a coupling assembly to transmit fluid therethrough. Both the male coupling 10 and the female threaded coupling 12 share the same central longitudinal axis A when they are in the coupled position as shown in FIG. 1C. In one embodiment, the male coupling 10 and/or the female threaded coupling 12 can be formed of stainless steel. In alternative embodiments, the male coupling 10 and/or the female threaded coupling 12 can be formed of other materials such as carbon steel, brass, aluminum, and plastic.

With reference back to FIG. 1B, the female threaded coupling 12 includes a receiving portion having a receiving end 14 and a remote portion (not shown) having a remote end (not shown). Extending through the female threaded coupling 12 between the receiving end 14 and the remote end (not shown) is a passageway 16 that permits fluid to flow therethrough. In one embodiment (not shown), the remote portion of the female threaded coupling 12 can include external threads for attachment to internal threads of a separate component (not shown) or the female threaded port can be integrated into an apparatus, such as a pump, manifold, etc. In an alternative embodiment (not shown), the female threaded coupling 12 can include other suitable connection means for attachment to a separate component (not shown).

The female threaded coupling 12 also includes a chamfered surface 18 that extends rearward and inward from the receiving end 14 and a set of internal threads 20 extend rearward from the chamfered surface 18. In the illustrated embodiment, the chamfered surface 18 serves as a sealing surface for receiving an annular seal, which will be discussed in more detail below. In another embodiment, the receiving end 14 of the female threaded coupling 12 can serve as a sealing surface for receiving an annular seal.

In the illustrated embodiment, the internal threads 20 have a trapezoidal-shaped profile when viewed in cross-section and include seven threads 20a-g. In alternative embodiments (not shown), the internal threads 20 can take the form of other profiles (e.g., triangular, square, or rectangular) when viewed in cross-section and include any number of threads. In another alternative embodiment (not shown), the female threaded coupling 12 may not include the chamfered surface 18.

Figure 2A:
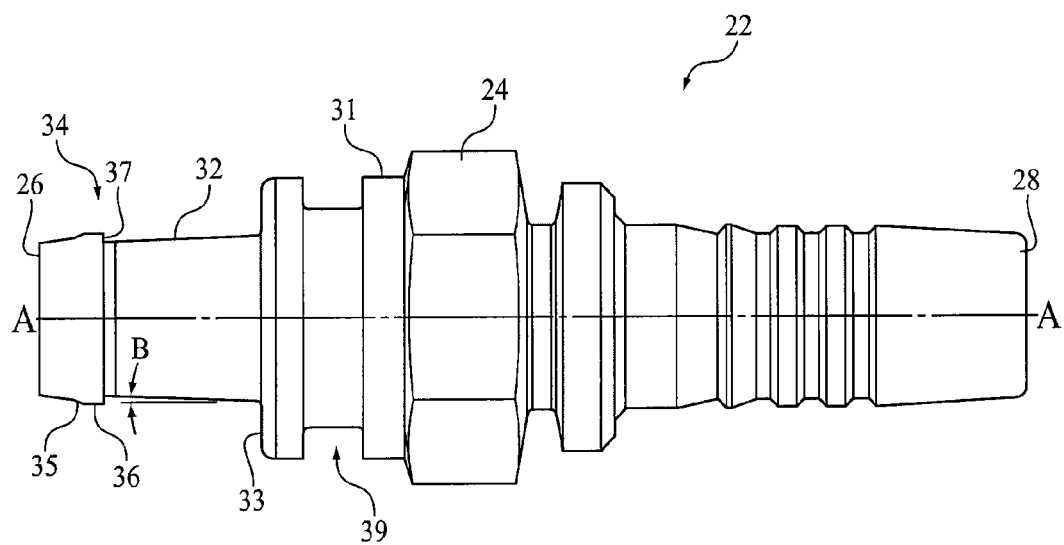
FIG. 2A illustrates top plan, cross-sectional, and end views of one embodiment of a body 22 that is employed in the male coupling 10.
Figure 2A:
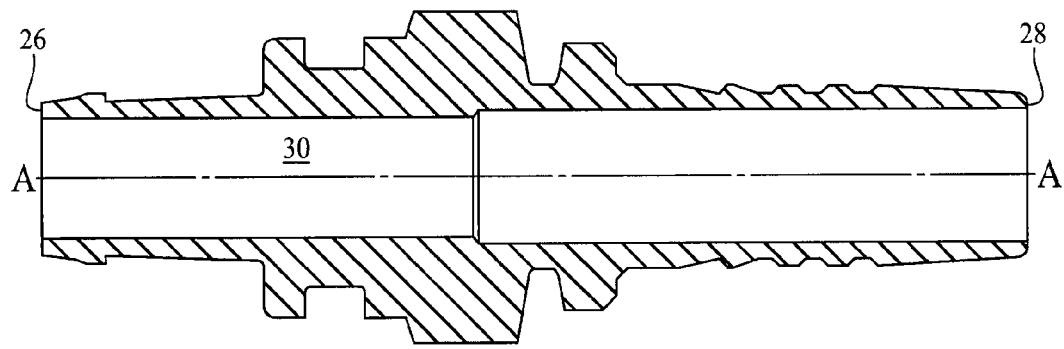

In the illustrated embodiment, the male coupling 10 includes a body 22. As shown in FIG. 2A, the body 22 includes a collar 24 that separates a leading portion having a leading end 26 and a trailing portion having a trailing end 28. Extending through the male coupling 10 from the leading end 26 to the trailing end 28 is a passageway 30 that permits fluid to flow therethrough. In the illustrated embodiment, the trailing portion of the male coupling 10 includes a hose nipple for receiving a hose. In an alternative embodiment (not shown), the trailing portion may be provided with external threads for attachment to a threaded coupling of another component. The collar 24 includes flats for engagement by a wrench if the trailing portion (not shown) is provided with external threads.

With continued reference to FIG. 2A, the leading portion of the body 22 includes a first exterior cylindrical surface 31 extending forward from the collar 24 and a tapered surface 32 that is separated from the first exterior surface 30 by a shoulder 33. The tapered surface 32 tapers toward the leading end 26 of the body 22 and is oriented at an angle B relative to the longitudinal axis A. In the illustrated embodiment, the angle B is about 2°. In alternative embodiments (not shown), the angle B can be between about 0° and about 90°. Alternatively, the surface 32 can include a step instead of a taper.

Forward of the tapered surface 32 is a retaining formation 34 that extends radially outward therefrom. In the illustrated embodiment, the retaining formation 34 includes a ramp 35 that extends outward and rearward from the leading end 26 of the body 22. Extending from the ramp 35 is a second exterior cylindrical surface 36 that meets a shoulder 37, which curves inwardly towards the tapered surface 32.

With reference back to FIG. 1D, the male coupling 10 also includes an annular support element, such as a split, resiliently expandable retaining ring 38, that is disposed about the tapered surface 32 and engages the shoulder 37. In the illustrated embodiment, the retaining ring 38 has a circular cross-section and a larger outer diameter than the second exterior surface 36. The retaining ring 38 serves as a shoulder to assist in locking the male coupling member 10 and the female threaded coupling 12 together, which will be discussed in more detail below. In alternative embodiments (not shown), the split locking ring can have a different cross-section such as triangular, trapezoidal, and square. In one embodiment, the retaining ring 38 can be formed of stainless spring steel. In alternative embodiments, the retaining ring 38 can be formed of other metals such as a spring tempered phosphoric bronze material, carbon steel, or stainless steel. In other embodiments (not shown), the body 22 can include an integral rib that serves as the annular support element, instead of the retaining ring 38.

The first exterior surface 31 of the body 22 includes an outwardly facing annular groove 39 extending radially inward therefrom. Positioned within the groove 39 are a support ring 40 constructed of a rigid material, such as plastic, leather, or hard rubber, and an annular seal 41 constructed of a suitable sealing material, such as neoprene or another elastomeric material. The annular seal 41 is positioned in the groove 39 between the support ring 40 and the leading end 26 of the body 22. The support ring 40 serves to protect the annular seal 41 from damage when the coupling assembly is used in high-pressure applications. In another embodiment (not shown), the support ring 40 may be eliminated when the coupling assembly is used in low-pressure applications.

Figure 2B:
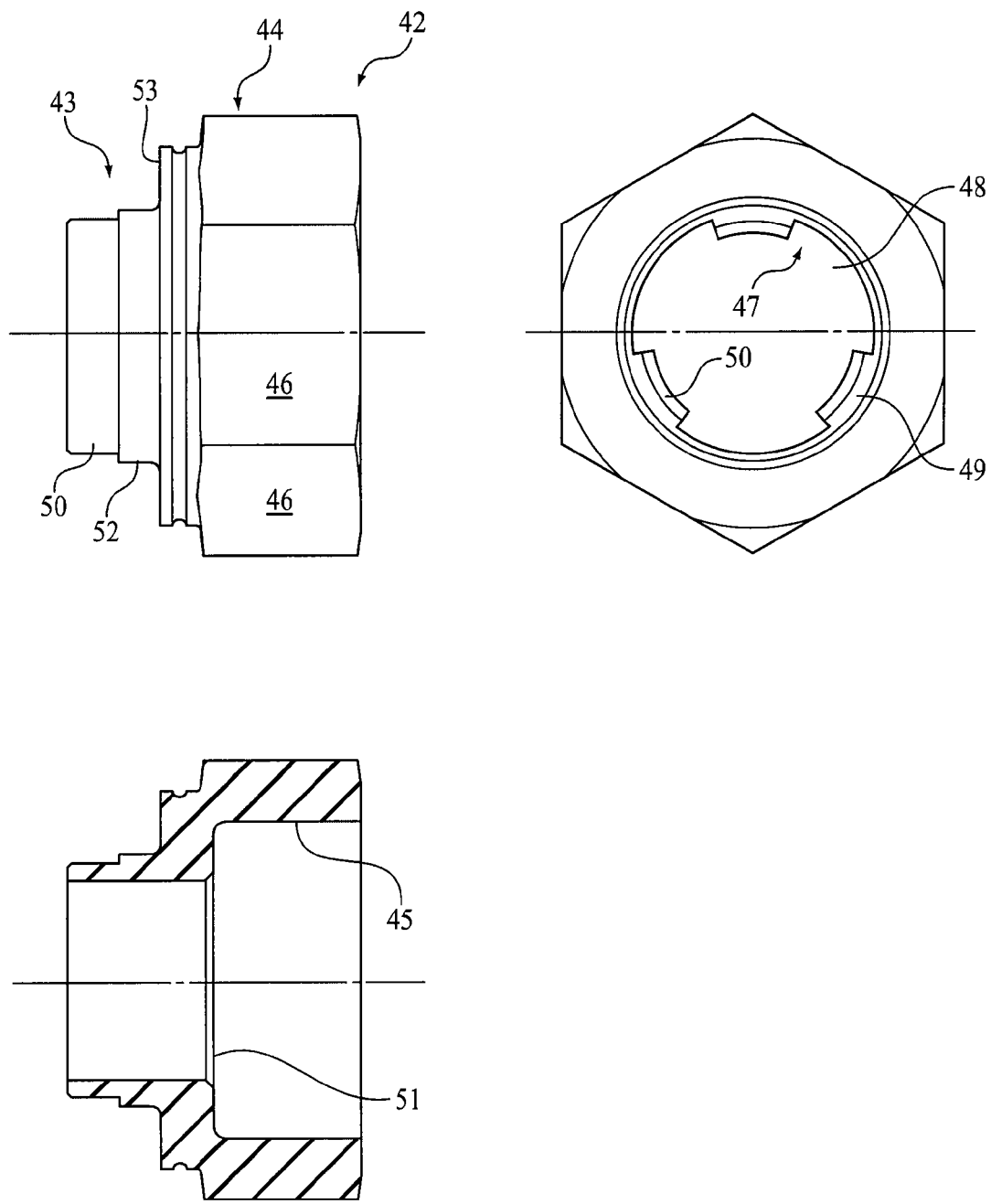
FIG. 2B illustrates top plan, cross-sectional, and end views of one embodiment of a nut 42 that is employed in the male coupling 10.

The male coupling 10 further includes an axially movable and rotatable sleeve 42 configured to assist in sealingly connecting the male coupling 10 to the female threaded coupling 12, which will be discussed in more detail below. In the illustrated embodiment, the sleeve 42 is disposed about the leading portion of the body 22 and configured to rotate and move axially relative to the body 22. As shown in FIG. 2B, the sleeve 42 includes a spline portion 43 and a body portion 44. The body portion 44 includes an interior cylindrical surface 45 and an exterior surface having a series of flats 46 for engagement by a wrench. The spline portion 43 includes a stepped interior surface 47 having three circumferentially-spaced, inwardly facing grooves 48 that define three circumferentially-spaced ribs 49. Extending axially forward from each rib 49 is a tab 50. In alternative embodiments (not shown), the stepped interior surface 47 can include a different number of grooves defining a different number of ribs. The stepped interior surface 47 of the spline portion 43 is separated from the interior surface 45 of the body portion 44 by a shoulder 51. The spline portion 43 of the sleeve 42 also includes an exterior surface 52 and a shoulder 53 that extends radial outward therefrom.

With reference back to FIG. 1D, the interior surface 45 of the body portion 44 is sized to receive the first exterior surface 31 of the body 22 and to receive the support ring 40 in the groove 39 of the body 22. The interior surface 45 of the body portion 44 is also sized to receive and sealingly engage the annular seal 41 in the groove 39 of the body 22, thereby preventing dust or other contaminants from entering the area forward of the annular seal 41 and keeping the fluid pressure inside the coupling assembly. The shoulder 51 is configured to engage the shoulder 33 of the body 22.

The male coupling 10 also includes an annular seal 54 disposed about the exterior surface 52 of the sleeve 42. The annular seal 54 may be constructed of neoprene or other suitable sealing material and is configured to sealingly engage the chamfered surface 18 of the female threaded coupling 12.

The male coupling 10 further includes a ratcheting locking member to lock the male coupling 10 and the female threaded coupling 12 together. In the illustrated embodiment, the locking member is in the form of three separate ratcheting, locking member segments 55 that are disposed about the leading portion of the body 22 and, together, form the ratcheting locking member. In alternative embodiments (not shown), the locking member can include a different number of ratcheting locking member segments.

Figure 2C:
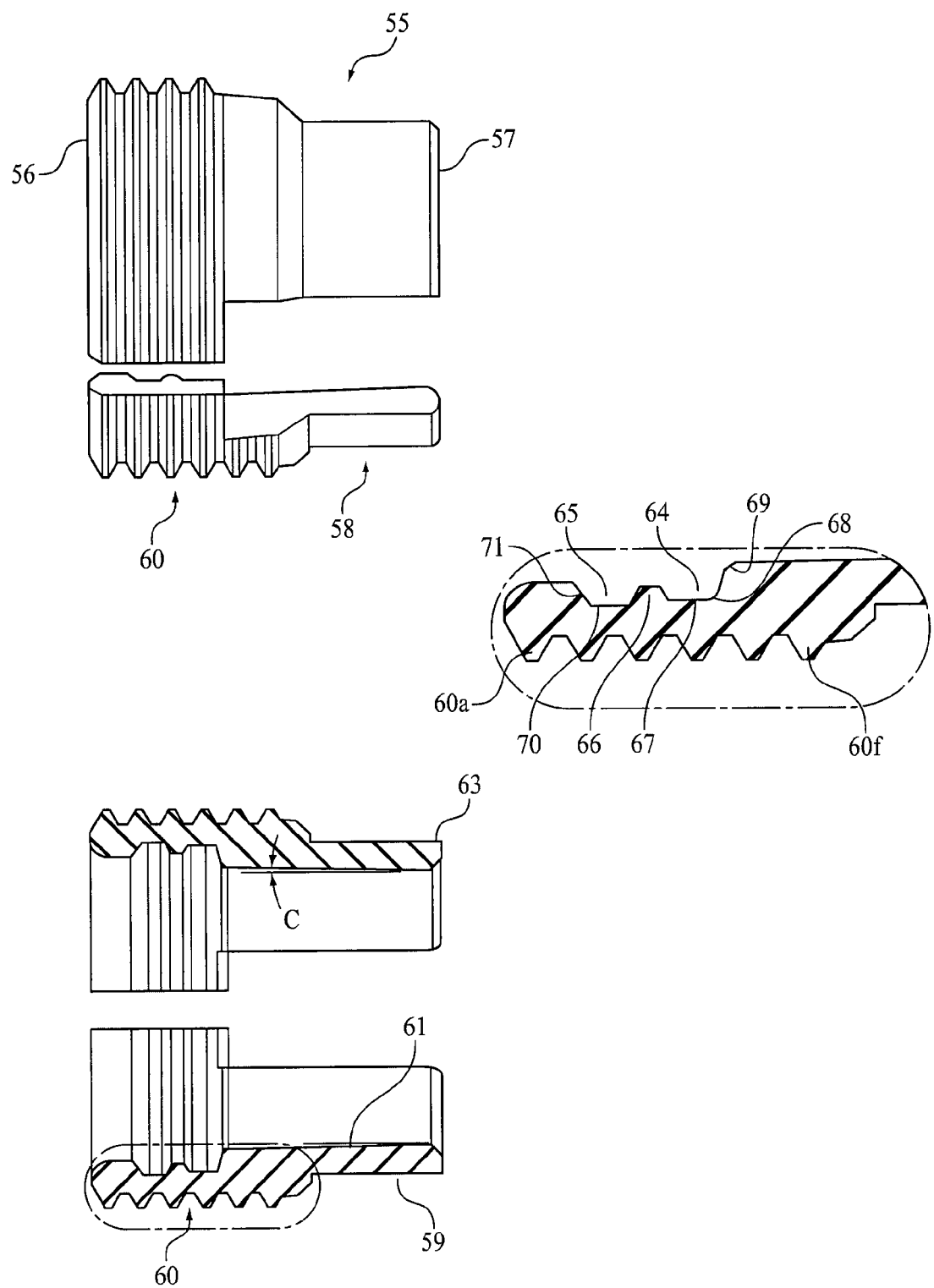
FIG. 2C illustrates top plan, cross-sectional, end, and detailed views of one embodiment of locking member segments 55 that is employed in the male coupling 10.

As shown in FIG. 2C, each locking member segment 55 includes a forward end 56, a rearward end 57, and a key portion 58 having an exterior cylindrical surface 59. The key portion 58 of each locking member segment 55 engages one of the grooves 48 in the spline portion 43 of the sleeve 42, thereby creating an interference between the locking member segments 55 and the sleeve 42. Due to this interference, rotation of the sleeve 42 causes the locking member segments 55 to rotate.

Each locking member segment 55 also includes a retaining formation that is configured to engage the internal threads 20 of the female threaded coupling 12 when the male coupling 10 is inserted into the female threaded coupling 12, which is discussed in further detail below. In the illustrated embodiment, the retaining formation includes an external partial threaded formation 60. The threaded formation 60 is characterized as being "partial" due to the fact that the ratcheting locking member is comprised of locking member segments 55. Hence, the partial threaded formation 60 of each locking member segment 55 comprises only a portion of a threaded formation. However, it will be appreciated that the locking member segments 55, together, form a threaded formation, although the threads may not be continuous since adjacent locking member segments 55 will have a small space in between them.

In the illustrated embodiment, the partial threaded formation 60 includes six trapezoidal-shaped threads 60*a-f* when viewed in cross-section. However, in alternative embodiments (not shown), the partial threaded formation 60 can include a different number of threads and/or the threads can take the form of other shapes when viewed in cross-section (e.g., triangular, square, or rectangular), so long as they are capable of meshing with and engaging the internal threads 20 of the female threaded coupling 12. Additionally, in alternative embodiments (not shown), the retaining formation can include a plurality of discrete radially outward extending projections or protrusions that are capable of engaging the internal threads 20 of the female threaded port 12. In these embodiments, the plurality of discrete radially outward extending projections or protrusions can take the form of any shape and can be arranged in any pattern, so long as they are capable of engaging the internal threads 20 of the female threaded port 12.

Figure 1D:
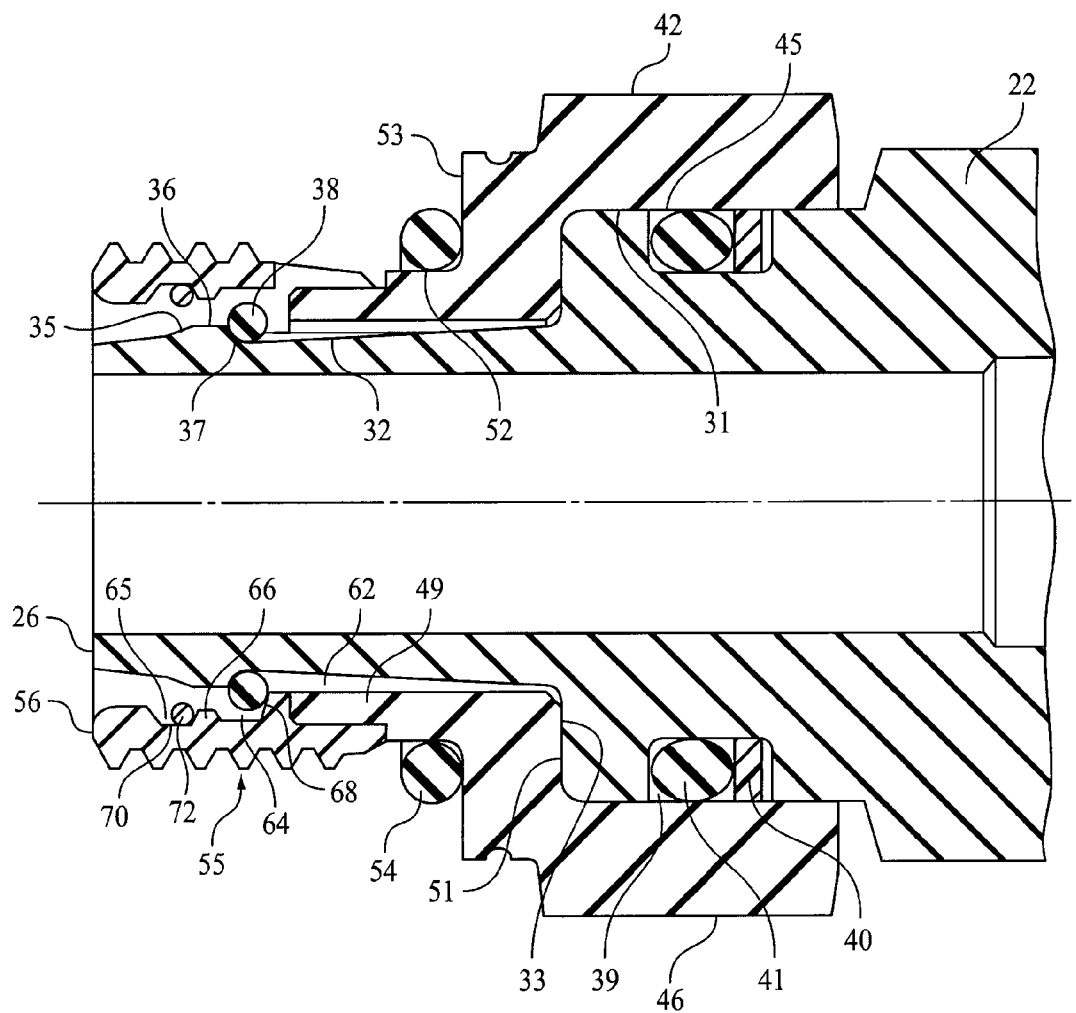
FIG. 1D illustrates a detailed view of a portion of the male coupling 10.

Each locking member segment 55 also includes an inner tapered surface 61 provided adjacent to the rearward end 57. The tapered surface 61 tapers toward the rearward end 57 of the locking member segment 55 and is oriented at an angle C relative to the longitudinal axis A. In the illustrated embodiment, the angle C is about 2°. In alternative embodiments (not shown), the angle C can be between about 0° and about 90°. As shown in FIG. 1D, a gap 62 is provided between the tapered surface 61 of each locking member segment 55 and the tapered surface 32 of the body 22. This gap 62 is created by the opposing tapered surfaces, i.e., the tapered surface 61 of each locking member segment 55 and the tapered surface 32 of the body 22.

Provided between the rearward end 57 and the tapered surface 61 of each locking member segment 55 is a rocking or pivoting surface 63. In the illustrated embodiment, the pivoting surface 63 is curved. Optionally, the pivoting surface 63 may be chamfered. The pivoting surface 63 defines a pivot axis P (extending out of the drawing) about which each locking member segment 55 pivots. The pivot axis P of each locking member segment 55 is spaced from and oriented perpendicular to the longitudinal axis A.

Due to the surface that defines the pivot axis P, each locking member segment 55 is capable of pivoting between a first position (i.e., a locking position) and a second position (i.e., a releasing position). In the locking position, the exterior surface 59 of the key portion 58 of each locking member segment 55 abuts against the interior surface 45 of the sleeve 42 as shown in FIG. 1D. In the releasing position (not shown), each locking member segment 55 is pivoted about the pivot axis P (thereby collapsing the partial threaded formation 60 radially inward), such that the tapered surface 61 of each locking member segment 55 abuts against the tapered surface 32 of the body 22. It will be appreciated, however, that the releasing position does not require the tapered surface 32 of each locking member segment 55 abuts against the tapered surface 32 of the body 22. Instead, each locking member segment 55 need only pivot a sufficient amount to provide clearance between the outer extremities of the partial threaded formation 60 of the locking member segment 55 and the inner extremities of the internal threads 20 of the female threaded coupling 12.

Forward of the tapered surface 61 of each locking member segment 55 is a groove formation. As shown in FIG. 2C, the groove formation in each locking member segment 55 includes two inwardly facing grooves 64, 65 separated by a triangular-shaped rib 66. Together, the grooves 64 in the locking member segments 55 form a first annular groove 64. Similarly, the grooves 65 in the locking member segments 55 form a second annular groove 98. In alternative embodiments (not shown), the rib 66 can take the form of other shapes when viewed in cross-section (e.g., square, rectangular, or trapezoidal).

The first groove 64 is at least partially defined by an interior cylindrical surface 67 and a shoulder 68 that extends radially inward therefrom. The interior surface 67 is sized to receive therein the retaining ring 38 when the locking member segments 55 are moved to their respective releasing position. A chamfered surface 69 extends at an angle inwardly from the shoulder 68 towards the rearward end 63 of each retaining member segment 55 to meet the tapered surface 61. The chamfered surface 69 serves as a locking surface, which will be discussed in more detail below. In the illustrated embodiment, the angle of the chamfered surface 69 relative to the longitudinal axis A is about 45°. It will be appreciated that the angle of the chamfered surface 69 relative to the longitudinal axis A can vary depending on the design. Additionally, in alternative embodiments (not shown), the surface 69 may be curved (e.g., convex or concave) instead of chamfered. The second groove 65 is at least partially defined by an interior cylindrical surface 70 and a shoulder 71 that extends radially inward therefrom.

In the illustrated embodiment, the male coupling 10 also includes an annular, resilient biasing element 72 positioned within the second groove 65, such that it engages the interior surface 70. The biasing element 72 is configured to bias the locking member segments 55 to the locking position. The biasing element 72 is trapped between the rib 66 and the shoulder 71, thereby limiting its axial movement. In the illustrated embodiment, the biasing element 72 is a spring ring that is capable of collapsing and return to its original state due to its resiliency. In alternative embodiments, the biasing element 72 can be made of a rubber or plastic material.

As shown in FIG. 1D, the biasing element 72 has a circular cross-section and a larger outer diameter than the second exterior surface 36 of the body 22. In alternative embodiments (not shown), the biasing element 72 can have a different cross-section such as triangular, trapezoidal, and square. In one embodiment, the biasing element 72 can be formed of stainless spring steel. In alternative embodiments, the biasing element 72 can be formed of other metals such as a spring tempered phosphoric bronze material, carbon steel, or stainless steel.

To couple the male coupling 10 to the female threaded coupling 12, the male coupling 10 is moved forward into the female threaded coupling 12 until the forward most partial thread 60a of the partial threaded formation 60 of each locking member segment 55 engages the forward most thread 20a of the female threaded coupling 12. Upon continued forward movement of the male coupling 10, the thread 20a of the female threaded coupling 12 interacts with and forces the locking member segments 55 to pivot about the pivot axis P against the urging of the biasing element 72. This causes the partial threaded formation 60 of each locking member segment 55 to contract radially inward, which causes the biasing element 72 to contract. The locking member segments 55 contract radially inward until they cam or "ratchet" over the apex of the thread 20a of the female threaded coupling 12. As soon as this occurs, the locking member segments 55 are biased or "spring back" to their respective locking positions due to the resiliency of the biasing element 72, such that the forward most partial thread 60a of the partial threaded formation 60 meshes with and engages the forward most thread 20a of the female threaded coupling 12.

Upon further forward movement of the male coupling 10 into the female threaded coupling 12, the partial threaded formation 60 of each locking member segment 55 cams or "ratchets" along the internal threads 20 of the female threaded coupling 12, by alternating between locking and releasing positions, to progressively mesh with and engage additional internal threads 20 of the female threaded coupling 12.

Once all of the partial threads 60 of the locking member segments 55 engage the internal threads 20 of the female threaded coupling 12, the male coupling 10 and the female threaded coupling 12 are mechanically coupled to each other. However, the connection is not complete until the male coupling 10 is also sealingly coupled to the female threaded coupling 12. To accomplish this, the sleeve 42 is rotated (e.g., in the clockwise direction) until its shoulder 53 engages the receiving end 14 of the female threaded coupling 12. The sleeve 42 is then torqued to fully compress the annular seal 54 against the chamfered surface 18 of the female threaded coupling 12 to sealingly couple the male coupling 10 to the female threaded coupling 12 (FIG. 1C). By torquing the sleeve 42, the mechanical connection between the male coupling 10 and the female threaded coupling 12 is also strengthened by drawing the body 22 away from the female threaded coupling 12. Also, additional torquing of the sleeve 42 eliminates a gap between the sleeve 42 and the receiving end 14 of the female threaded coupling 12, and prevents extrusion of the annular seal 54 under high pressure. Preferably, the male coupling 10 is designed such that only a ¼ to a ½ turn of the sleeve 42 is required to complete the connection. Once in this position, the male coupling 10 is prevented from being withdrawn from and is sealingly engaged to the female threaded coupling 12. Additionally, the male coupling 10 is prevented from swiveling relative to the female threaded coupling 12.

When it is desired to uncouple the male coupling 10 from the female threaded coupling 12, the sleeve 42 is rotated in the opposite direction (e.g., in the counter-clockwise direction) to unthread the male coupling 10 from the female threaded coupling 12 until the two components are in the uncoupled position (FIG. 1B).

Figure 3A:
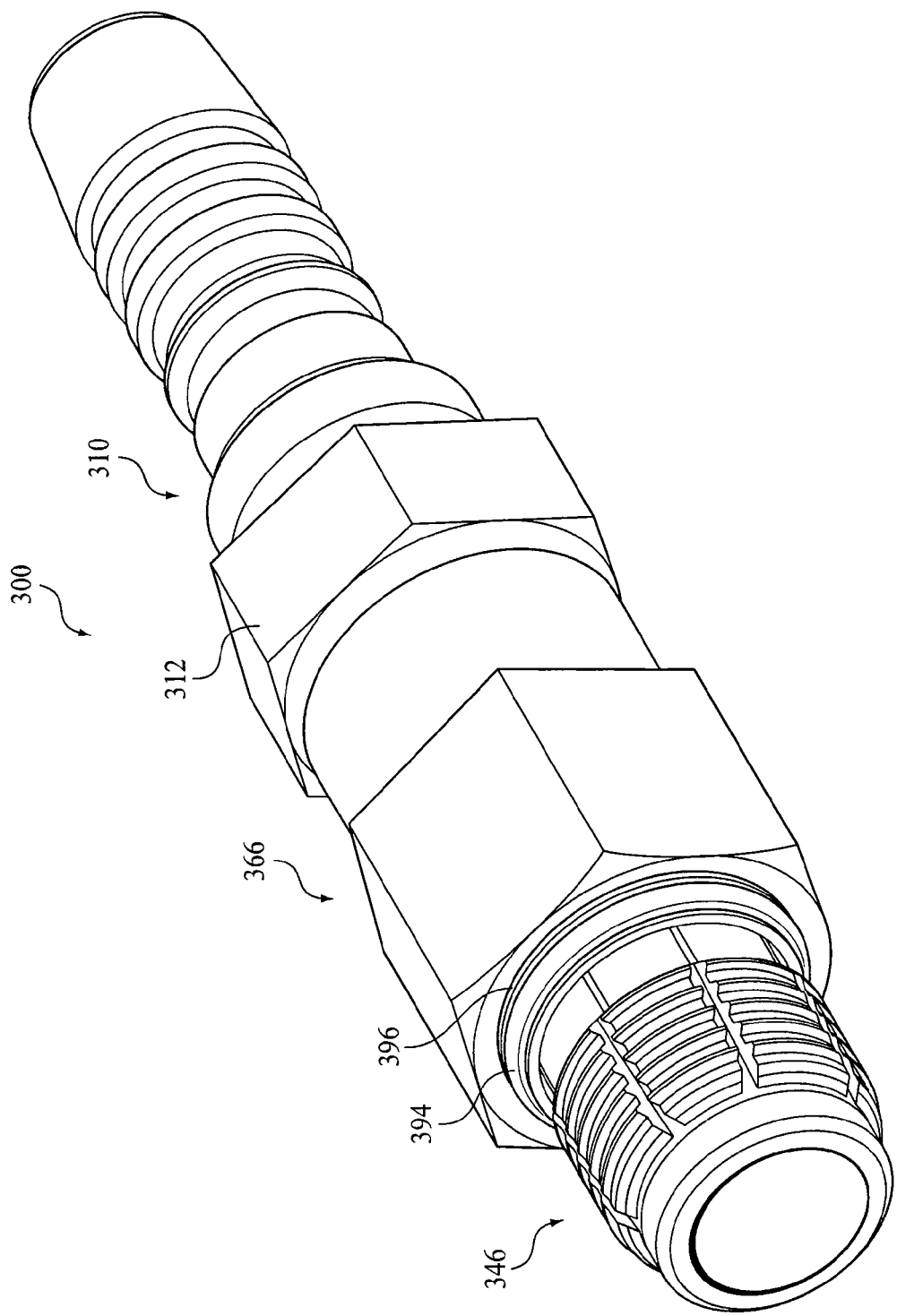
FIGS. 3A and 3B illustrate perspective and cross-sectional views, respectively, of another embodiment of a male coupling 300 configured to be connected to a female threaded coupling.
Figure 3B:
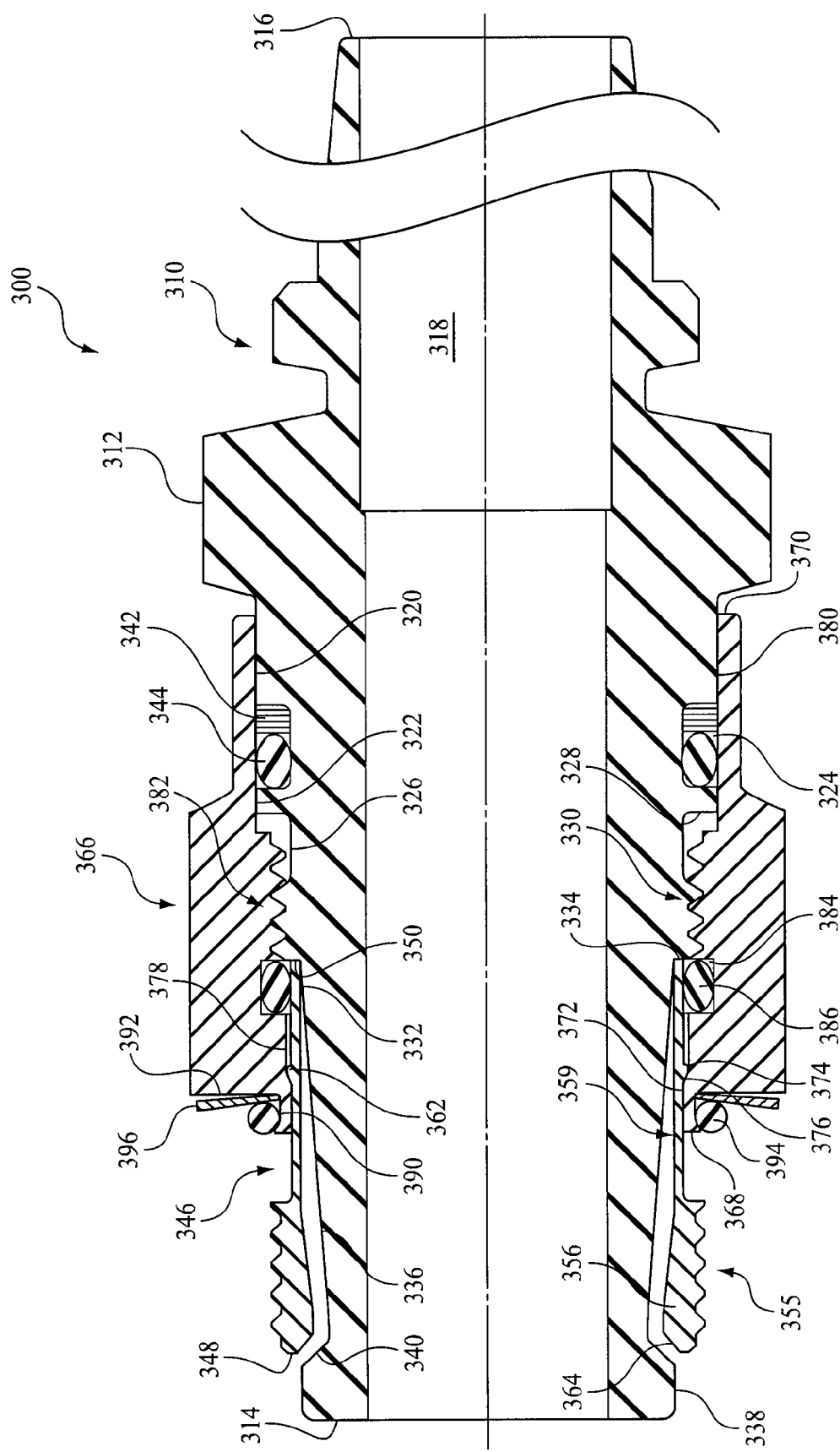

Illustrated in FIGS. 3A and 3B are perspective and cross-sectional views, respectively, of another embodiment of a male coupling 300 configured to be coupled to and separable from a female threaded coupling 12 similar to the one discussed above and illustrated in FIG. 1B. Together, the male coupling 300 and the female threaded coupling 12 operate as a push-to-connect type coupling assembly, which will be discussed in further detail below.

In the coupled position, the male coupling 300 and the female threaded coupling 12 function as a coupling assembly to transmit fluid therethrough. Both the male coupling 300 and the female threaded coupling 12 share the same central longitudinal axis A when they are in the coupled position (not shown). In one embodiment, the male coupling 300 can be formed of stainless steel. In alternative embodiments, the male coupling 300 can be formed of other materials such as carbon steel, brass, aluminum, and plastic.

Figure 4A:
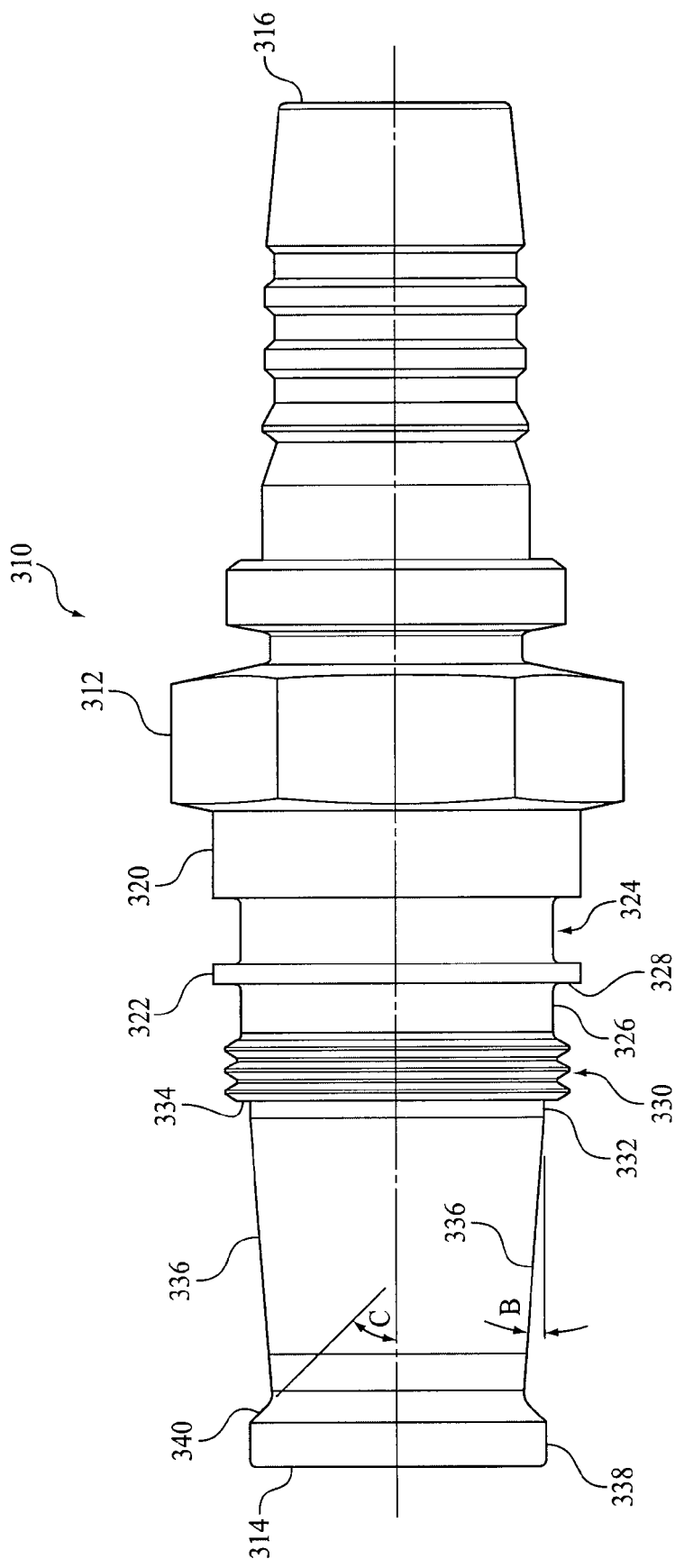
FIG. 4A illustrates a top plan view of one embodiment of a body 310 that is employed in the male coupling 300.

In the illustrated embodiment, the male coupling 300 includes a body 310. As shown in FIGS. 3B and 4A, the body 310 has a collar 312 that separates a leading portion having a leading end 314 and a trailing portion having a trailing end 316. Extending through the male coupling member 300 from the leading end 314 to the trailing end 316 is a passageway 318 that permits fluid to flow therethrough. In the illustrated embodiment, the trailing portion of the male coupling 300 includes a hose nipple for receiving a hose. In an alternative embodiment (not shown), the trailing portion may be provided with external threads for attachment to a threaded coupling of another component. The collar 312 includes flats for engagement by a wrench if the trailing portion (not shown) is provided with external threads.

The leading portion of the body 310 includes a first exterior cylindrical surface 320 extending from the collar 312 and a second exterior cylindrical surface 322 that is separated from the first exterior surface 320 by an outwardly facing annular groove 324 extending radially inward therefrom. The leading portion of the body 310 also includes a third exterior cylindrical surface 326 that is separated from the first exterior surface 320 by a shoulder 328. Forward of the second exterior surface 326 is a set of external threads 330, which can be left-handed or right-handed threads depending on the design.

The leading portion of the body 310 further includes a fourth exterior cylindrical surface 332 that is separated from the set of external threads 330 by a shoulder 334. Extending forward and inward from the fourth exterior surface 332 is a first exterior tapered surface 336, which tapers toward the leading end 314 of the body 310 and is oriented at an angle B relative to the longitudinal axis A. In the illustrated embodiment, the angle B is about 9°. In alternative embodiments (not shown), the angle B can be oriented at other angles depending on the design.

Extending rearward from the leading end 314 of the body 310 is a fifth exterior cylindrical surface 338. A second exterior tapered surface 340 extends rearward and inward from the fifth exterior surface 338 to meet the first tapered surface 336. The second tapered surface 340 tapers toward the trailing end 316 of the body 310 and is oriented at an angle C relative to the longitudinal axis A. In the illustrated embodiment, the angle C is about 50°. In alternative embodiments (not shown), the angle C can be oriented at other angles depending on the design.

In the illustrated embodiment, a support ring 342, which can be constructed of rigid plastic, leather, or hard rubber, and an annular seal 344, which can be constructed of neoprene or other suitable sealing material, are positioned within the groove 324. The support ring 342 is positioned in the groove 324 between the annular seal 328 and the leading end 314 of the body 310. The support ring 342 serves to protect the annular seal 344 from damage when the male coupling 300 and the female threaded coupling 12 are used in high-pressure applications. In another embodiment (not shown), the support ring 342 may be eliminated in certain applications, for example, when the male coupling 300 and the female threaded coupling 12 are used in low-pressure applications.

The male coupling 300 further includes a locking member disposed about the leading portion of the body 310. In the illustrated embodiment, the locking member is in the form of a crown-shaped, ratcheting locking member 346 having a forward end 348 and a rearward end 350 that engages the shoulder 334 of the body 310. It will be appreciated that the locking member 346 can take the form of a different shape than crown-shaped depending on the design.

Figure 4B:
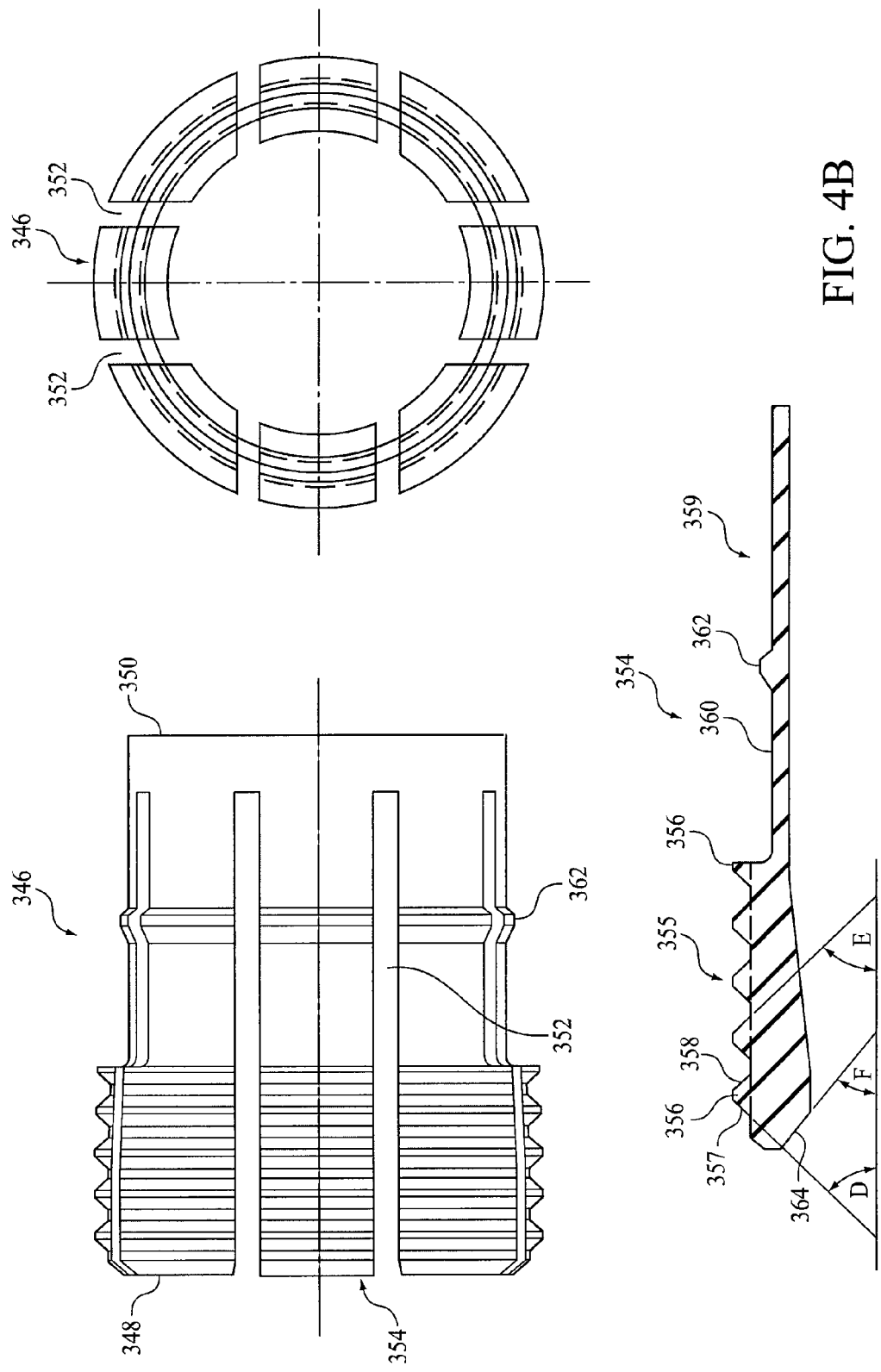
FIG. 4B illustrates top plan, detailed, and end views of one embodiment of a locking member 346 that is employed in the male coupling 300.

With reference to FIGS. 3B and 4B, extending from the forward end 348 of the locking member 346 are a plurality of axial slots 352 that form a plurality of resilient fingers 354, which are joined together adjacent the rearward end 350 of the locking member 346. In the illustrated embodiment, the locking member 346 includes eight resilient fingers 354. In alternative embodiments, the locking member can include a different number of slots and fingers. In one embodiment, the locking member 346 is formed of stainless spring steel. In alternative embodiments, the locking member 346 can be formed of other metals such as a spring tempered phosphoric bronze material, carbon steel, stainless steel, plastic, or rubber.

Each resilient finger 354 of the locking member 346 includes a retaining formation that is configured to engage the internal threads 20 of the female threaded coupling 12 when the male coupling 300 is inserted into the female threaded coupling 12, which will be discussed in further detail below. In the illustrated embodiment, the retaining formation includes an external partial threaded formation 355. The threaded formation 355 is characterized as being "partial" due to the fact that the locking member 346 is comprised of resilient fingers 354. Hence, the partial threaded formation 355 of each resilient finger 354 comprises only a portion of a threaded formation. However, it will be appreciated that the resilient fingers 354, together, form a threaded formation, although the threads may not be continuous since adjacent resilient fingers 354 will have a small space in between them.

In the illustrated embodiment, the partial threaded formation 355 includes four trapezoidal-shaped partial threads 356 when viewed in cross-section. Each partial thread 356 includes a lead-in tapered surface 357 and a locking tapered surface 358. The lead-in tapered surface 357 of each partial thread 356 tapers toward the forward end 348 of the locking member 346 and is oriented at an angle D relative to the longitudinal axis A. In the illustrated embodiment, the angle D is about 30°. In alternative embodiments (not shown), the angle D can be oriented at other angles depending on the design. It will be appreciated that the smaller the angle D, the smaller amount of force is required to insert the male coupling 300 into the female threaded coupling 12. The locking tapered surface 358 of each partial thread 356 tapers toward the rearward end 350 of the locking member 346 and is oriented at an angle E relative to the longitudinal axis A. In the illustrated embodiment, the angle E is about 60°. In alternative embodiments (not shown), the angle E can be oriented at other angles depending on the design.

In alternative embodiments (not shown), the partial threaded formation 355 can include a different number of threads and/or the threads can take the form of other shapes when viewed in cross-section (e.g., triangular, square, or rectangular), so long as they are capable of meshing with and engaging the internal threads 20 of the female threaded coupling 12. Additionally, in alternative embodiments (not shown), the retaining formation can include a plurality of discrete radially outward extending projections or protrusions that are capable of engaging the internal threads 20 of the female threaded port 12. In these embodiments, the plurality of discrete radially outward extending projections or protrusions can take the form of any shape and can be arranged in any pattern, so long as they are capable of engaging the internal threads 20 of the female threaded port 12.

Each resilient finger 354 is capable of moving between a first position (i.e., a locking position) and a second position (i.e., a releasing position). In the locking position, the threads of the partial threaded formation 355 engage the internal threads 20 of the female threaded coupling 12 when the male coupling 300 is inserted into the female threaded coupling 12. In the releasing position (not shown), each resilient finger 354 flexes at its base where it joins the other resilient fingers 354, such that the partial threaded formation 355 of each resilient finger 354 collapses radially inward and the partial threaded formation 355 disengages from the internal threads 20 of the female threaded coupling 12. Due to its resiliency, the resilient fingers 354 are capable of returning to their respective locking positions without the need of additional force.

Each resilient finger 354 of the locking member 346 also includes a stem portion 359 provided rearward of the partial threaded formation 355. The stem portion 359 of each resilient finger 354 includes an exterior surface 360 having a radially outward protruding bump 362 extending therefrom. The bump 362 can include a curved surface, a combination of curved and straight surfaces, or a combination of straight surfaces.

Additionally, the locking member 346 includes an inner tapered surface 364 extending rearward from the forward end 348 of the locking member 346. The inner tapered surface 364 tapers toward the rearward end 350 of the locking member 346 and is oriented at an angle F relative to the longitudinal axis A. In the illustrated embodiment, the angle F is about 50°, which is the same as the angle C of the second tapered surface 340 of the body 310. In alternative embodiments (not shown), the angle F can be oriented at other angles depending on the design.

When the male coupling 300 is coupled to the female thread coupling 12, which will be discussed in more detail below, there are two competing forces acting on the resilient fingers 354 of the locking member 346—(i) the force created by the interaction between the second tapered surface 340 of the body 310 and the interior tapered surface 364 of the locking member 346, which forces the resilient fingers 354 radially outward to their locking positions and (ii) the interaction between the partial threads 356 of the resilient fingers 354 and the internal threads 20 in the female threaded coupling 12, which forces the resilient fingers 354 radially inward to their releasing positions. To ensure that the resilient fingers 354 are forced radially outward to their respective locking positions under pressure, the angle C of the second tapered surface 340 of the body 310 and the angle F of the inner tapered surface 364 of the locking member 346 should be less than the angle E of the locking tapered surface 358 of each partial thread 356 of the locking member 346. In the illustrated embodiment, the angle C of the second tapered surface 340 of the body 310 and the angle F of the inner tapered surface 364 of the locking member 346 is about 10° less than the angle E of the locking tapered surface 358 of each partial thread 356 of the locking member 346. However, it will be appreciated that these angles can differ by a different amount depending on the design. Additionally, it will be appreciated that the angle C of the second tapered surface 340 of the body 310 and the angle F of the inner tapered surface 364 of the locking member 346 need not be less than the angle E of the locking tapered surface 358 of each partial thread 356 of the locking member 346 in certain circumstances (e.g., when a biasing element, such as a spring, is used to assist in forcing the resilient fingers 354 radially outward or when a wedge or other retaining device is used to force the resilient fingers 354 radially outward and prevent them from moving radially inward until the wedge or other retaining device is removed).

Figure 4C:
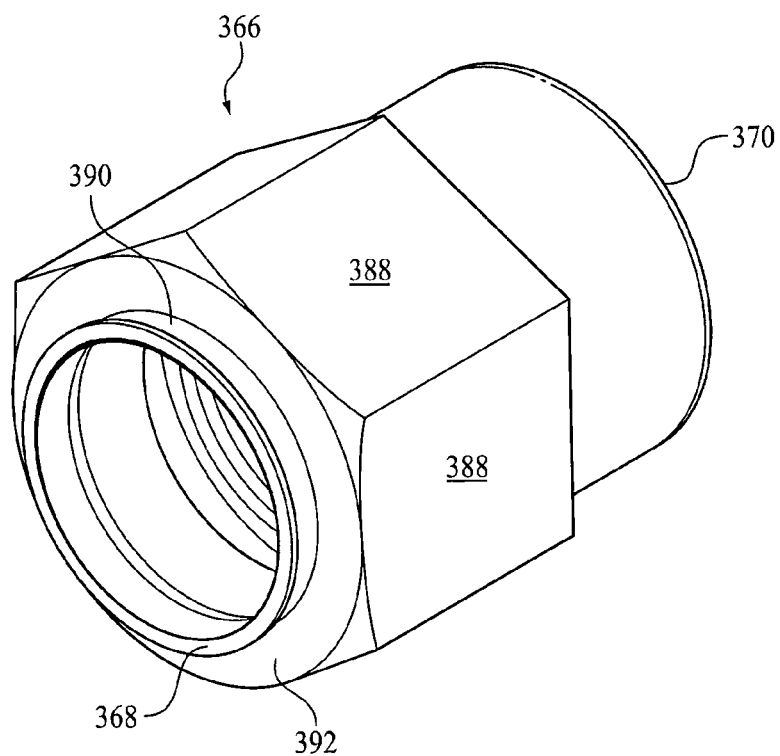
FIG. 4C illustrates perspective and cross-sectional views of one embodiment of a nut 366 that is employed in the male coupling 300.
Figure 4C:
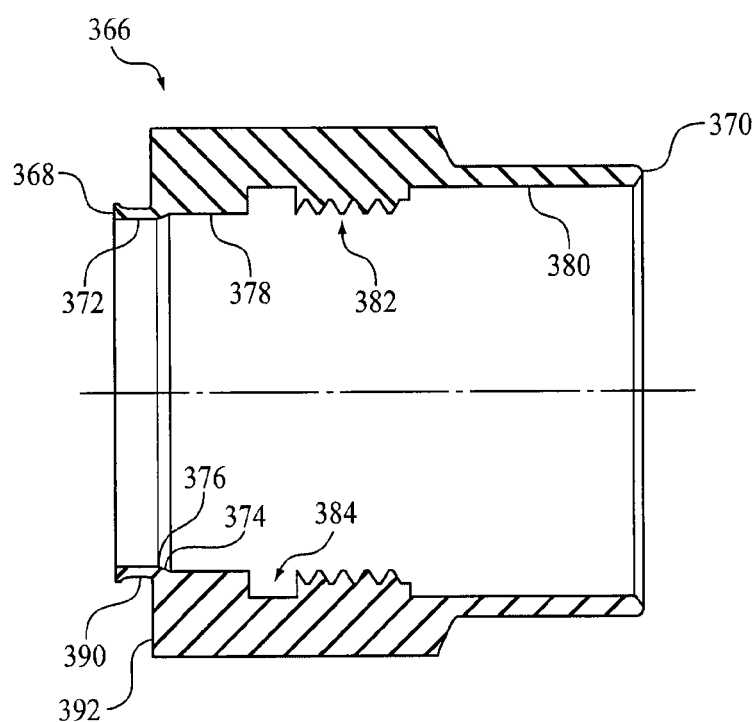

The male coupling 300 further includes an axially movable and rotatable sleeve 366 configured to assist in sealingly connecting the male coupling 300 to the female threaded coupling 12, which will be discussed in more detail below. In the illustrated embodiment, the sleeve is in the form of a threaded nut (hereinafter referred to as "nut 366") that is disposed about the leading portion of the body 310 and configured to rotate and, thus, move axially relative to the body 310. As shown in FIGS. 3B and 4C, the nut 366 includes a forward end 368 and a rearward end 370. Extending rearward from the forward end 368 of the nut 366 is a first interior cylindrical surface 372, which is sized to receive the exterior surface 360 of the stem portion 359 of each resilient finger 354. The first interior surface 372 is positioned forward of the bump 362 on the stem portion 359 of each resilient finger 354 when the male coupling 300 is in an assembled state. Extending rearward and outward from the first interior surface 372 is a ramped surface 374, where the meeting of the first interior surface 372 and the ramped surface 374 defines an edge 376. A second interior cylindrical surface 378 extends rearward from the ramped surface 374.

The edge 376 of the nut 366 is configured to engage the bump 362 on the stem portion 359 of each resilient finger 354 of the locking member 346 when the nut 366 is moved rearward (e.g., by rotating the nut 366 in the counter-clockwise direction). Once the edge 376 of the nut 366 engages the bump 362 on the stem portion 359 of each resilient finger 354, it begins to force the resilient fingers 354 to flex radially inward toward their respective releasing positions. Upon continued rearward movement of the nut 366, the edge 376 and the first interior surface 372 of the nut 366 cam over the bump 362, thereby forcing the resilient fingers 354 to flex radially inward to their respective releasing positions until the partial threaded formation 355 of each resilient finger 354 no longer engages the internal threads 20 in the female threaded coupling 12.

Extending forward from the rearward end 370 of the nut 366 is a third interior cylindrical surface 380, which is sized to receive the first exterior surface 320 of the body 310 and to receive the support ring 42 in the groove 324. The third interior surface 380 is also sized to receive and sealingly engage the annular seal 344 in the groove 324 of the body 310, thereby preventing dust or other contaminants from entering the area forward of the annular seal 344 and keeping the fluid pressure inside the male coupling 300 and the female threaded coupling 12.

Provided between the second and third interior surfaces 378, 380 is a set of internal threads 382 that are configured to threadingly engage the set of external threads 334 on the body 310. Due to the threading engagement between the nut 366 and the body 310, the nut 366 acts as a "jam nut" to further strengthen the connection between the male coupling 300 and the female threaded coupling 12 and also serves to assist in sealingly connecting the male coupling 300 and the female threaded coupling 12, which will be described in further detail below.

In the illustrated embodiment, an inwardly facing groove 384 is provided between the second interior surface 378 and the set of internal threads 382 of the nut 366 and extends radially outward from the second interior surface 378. Positioned within the groove 378 is a limited friction element, such as an O-ring 386, which has an inner diameter that is less than the inner diameter of the second interior surface 378. Because of the difference in diameter, the O-ring 386 is compressed between the nut 366 and the locking member 346 when the nut 366 is assembled onto the locking member 346. The purpose of the limited friction element (e.g., the compressed O-ring 386) is to mechanically link the nut 366 to the locking member 346 by creating friction between the nut 366 and the locking member 346, such that the locking member 346 rotates when the nut 366 is rotated. The locking member 346 is permitted to be rotated by the nut 366 until the nut 366 bottoms out on the female threaded coupling 12, in which case the frictional bond between the nut 366 and the locking member 346 is broken. In other words, the O-ring 386 serves as a clutch that, under a certain load (e.g., at a time before the nut 366 engages the female threaded coupling 12), will permit the locking member 346 to be rotated when the nut 366 is rotated, but, under a greater load (e.g., at a time after the nut 366 engages the female threaded coupling 12), the locking member 346 will no longer rotate when the nut 366 is rotated (i.e., the nut 366 can rotate independent of the locking member 346).

The rotation of the locking member 346 by the nut 366 accomplishes two things: i) it helps draw the male coupling 300 into the female threaded coupling 12, which reduces the possibility of an installer not inserting the male coupling 300 far enough into the female threaded coupling 12; and ii) it reduces the number of rotations of the nut 366 to complete the connection between the male coupling 300 into the female threaded coupling 12. In alternative embodiments (not shown), the O-ring 386 can be replaced with a series of ball detents on the corresponding components, a plastic ring, or any other component(s) (annular or non-annular) that can create a limited amount of friction between the nut 366 and the locking member 346.

The nut 366 also includes a series of flats 388 for engagement by a wrench, an exterior cylindrical surface 390 extending rearward from the forward end 368 of the nut 366, and a shoulder 392 extending radially outward from the exterior surface 390. Disposed on the exterior surface 390 is an annular seal 394 that is configured to sealingly engage the chamfered surface 18 of the female threaded coupling 12. The annular seal 394 may be constructed of neoprene or other suitable sealing material.

Figure 3C:
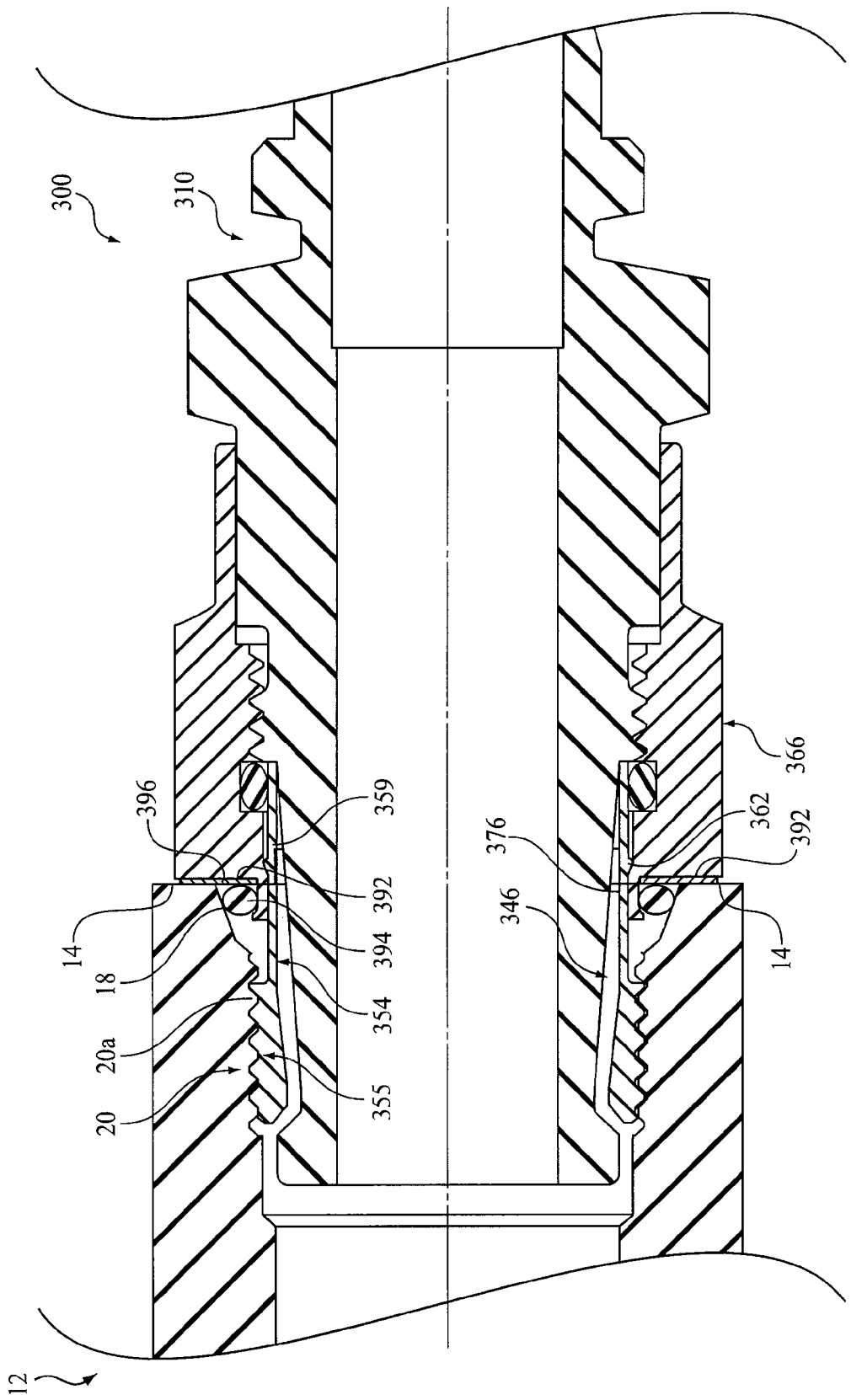
FIG. 3C illustrates a cross-sectional view of the male coupling 10 in its coupled position relative to a female threaded coupling 12.

In the illustrated embodiment, the male coupling 300 further includes a beveled washer 396 provided between the annular seal 394 and the shoulder 392 of the nut 366. The beveled washer 396 is shown in its neutral state in FIG. 3B and is shown in its compressed state in FIG. 3C. In an alternative embodiment (not shown), the beveled washer may be replaced with a spring washer or a lock washer. In another alternative embodiment (not shown), the beveled washer 396 may be eliminated in certain applications, for example, when the male coupling 300 and the female threaded coupling 12 are used in low-pressure applications.

The purpose of the beveled washer 396 is to prevent involuntary unthreading of the nut 366 that can occur when the coupling assembly is subjected to high impulse pressure conditions. In these situations, the unthreading of the nut 366 creates a gap between the nut 366 and the receiving end 14 of the female threaded coupling 12, permitting the annular seal 394 to extrude through the gap, resulting in fluid leakage.

Through experimentation, it was determined that the involuntary unthreading of the nut 366 was caused by: (i) the resilient fingers 354 of the locking member 346 becoming indented into the body 310, and (ii) the resilient fingers 354 of the locking member 346 expanding radially outward towards the internal threads 20 of the female thread coupling 12. It was found that, due to this indention and expansion, the nut 366 would lose its preload (which was applied at the time the nut 366 was torqued), resulting in the creation of the gap between nut 366 and the receiving end 14 of the female threaded coupling 12. By employing the beveled washer 396 between the annular seal 394 and the shoulder 392 of the nut 366, the beveled washer 396 is flattened to its compressed state (FIG. 3C) after the male coupling 300 is inserted into the female threaded coupling 12 and the nut 366 is torqued. The beveled washer 396, while in its compressed state, is biased towards its neutral state due to its resiliency, such that it can make up for any preload loss in the nut 366 (to the extent there is any preload loss). Another way to prevent involuntary unthreading of the nut 366 that can occur when the coupling assembly is subjected to high impulse pressure conditions is to heat treat some or all of the surfaces of the body 310, the locking member 346, and/or the nut 366 to make them harder and limit the amount of indenting that occurs between these components.

It will be appreciated that, when the beveled washer 396 is installed onto the nut 366, there is a small diametrical clearance between the beveled washer 396 and the nut 366. In certain high impulse pressure conditions, the small diametrical clearance is enough to permit extrusion of the annular seal 394 therethrough. To avoid this, the through-hole in the beveled washer 396 can be formed when the beveled washer 396 is in its neutral state, as opposed to being formed in a flat or compressed state. By forming the through-hole in the beveled washer 396 in its neutral state, the inner diameter of the beveled washer 396 is tapered inward when the beveled washer 396 is flattened out, thereby reducing or possibly eliminating the clearance between the beveled washer 396 and the nut 366 after the nut 366 is torqued down.

To couple the male coupling 300 to the female threaded coupling 12, the male coupling member 300 is moved forward into the female threaded coupling 12 until the forward most partial thread 355a of the partial threaded formation 355 of each resilient finger 354 of the locking member 346 engages the forward most thread 20a of the female threaded coupling 12. Upon continued forward movement of the male coupling 300, the forward most thread 20a of the female threaded coupling 12 interacts with and forces the resilient fingers 354 to flex inward, such that the partial threaded formation 355 of the resilient fingers 354 contracts radially inward. The resilient fingers 354 contract radially inward until they cam or "ratchet" over the apex of the thread 20 of the female threaded coupling 12. As soon as this occurs, the resilient fingers 354 "spring back" to their respective locking positions due to their resiliency, such that the forward most partial thread 355a of the partial threaded formation 355 meshes with and engages the forward most thread 20a of the female threaded coupling 12.

Upon further forward movement of the male coupling 300 into the female threaded coupling 12, the partial threaded formation 355 of each resilient finger 354 cams or "ratchets" along the internal threads 20 of the female threaded coupling 12, by alternating between locking and releasing positions, to progressively mesh with and engage additional internal threads 20 of the female threaded coupling 12.

Once all of the partial threads of the partial threaded formation 355 of the resilient fingers 354 engage the internal threads 20 of the female threaded coupling 12, the male coupling 300 and the female threaded coupling 12 are mechanically connected to each other. However, the connection is not complete until the male coupling 300 is also sealingly connected to the female threaded coupling 12. To accomplish this, the nut 366 is rotated (e.g., in the clockwise direction) until its shoulder 392 engages the receiving end 14 of the female threaded coupling 12. The nut 366 is then torqued to fully compress the annular seal 394 against the chamfered surface 18 of the female threaded coupling 12 to sealingly couple the male coupling 300 to the female threaded coupling 12. By torquing the nut 366, the mechanical connection between the male coupling 300 and the female threaded coupling 12 is also strengthened by drawing the body 310 away from the female threaded coupling 12. Specifically, because the angle C of the second tapered surface 340 of the body 310 and the angle F of the inner tapered surface 364 of the locking member 346 is less than the angle E of the locking tapered surface 358 of each partial thread 356 of the locking member 346, the resilient fingers 354 are forced radially outward to their locking positions.

Furthermore, by torquing the nut 366, the beveled washer 396 is flattened to its compressed state (FIG. 3C), thereby eliminating a gap between the nut 366 and the receiving end 14 of the female threaded coupling 12. While in its compressed state, the beveled washer 396 is biased towards its neutral state, due to its resiliency, such that it can make up for any preload loss in the nut 366 (to the extent there is any preload loss), thereby preventing extrusion of the annular seal 394 under high pressure. Preferably, the male coupling 300 is designed such that only a ¼ to a ½ turn of the nut 366 is required to complete the connection. Once in this position, the male coupling 300 is prevented from being withdrawn from and is sealingly engaged to the female threaded coupling 12. Additionally, the male coupling 300 is prevented from swiveling relative to the female threaded coupling 12.

When it is desired to uncouple the male coupling 300 from the female threaded coupling 12, the nut 366 is rotated in the opposite direction (e.g., in the counter-clockwise direction) to cause the nut 366 to move rearward. Once the edge 376 of the nut 366 engages the bump 362 on the stem portion 359 of each resilient finger 354 of the locking member 346, the resilient fingers 354 are forced to flex radially inward (to their respective releasing positions) until the partial threaded formation 355 of each resilient finger 354 no longer engages the threads 20 in the female threaded coupling 12. When this happens, the male coupling 300 can be withdrawn from the female threaded coupling 12.

In an alternative embodiment (not shown), the nut 366 can be replaced with a sleeve biased in the forward direction. In this alternative embodiment, the third interior surface 380 of the nut 366 can be dimensioned larger than the outer diameter of the chamfered surface 18 of the female threaded coupling 12 to create a force that biases the sleeve 366 in the forward direction. The force pressing on the sleeve 366 can assist in compressing the annular seal 394 against the sealing surface of the female threaded coupling 12. In another alternative embodiment (not shown), the nut 366 can be replaced with a spring-loaded sleeve biased in the forward direction. Like the alternative embodiment discussed above, the force pressing on the sleeve 366 can assist in compressing the annular seal 394 against the sealing surface of the female threaded coupling 12. In yet another alternative embodiment (not shown), the nut 366 can be replaced with a spring-loaded sleeve biased in the forward direction and the third interior surface 380 of the nut 366 can be dimensioned larger than the outer diameter of the chamfered surface 18 of the female threaded coupling 12 to create an additional force that biases the sleeve 366 in the forward direction.

Figure 5B:
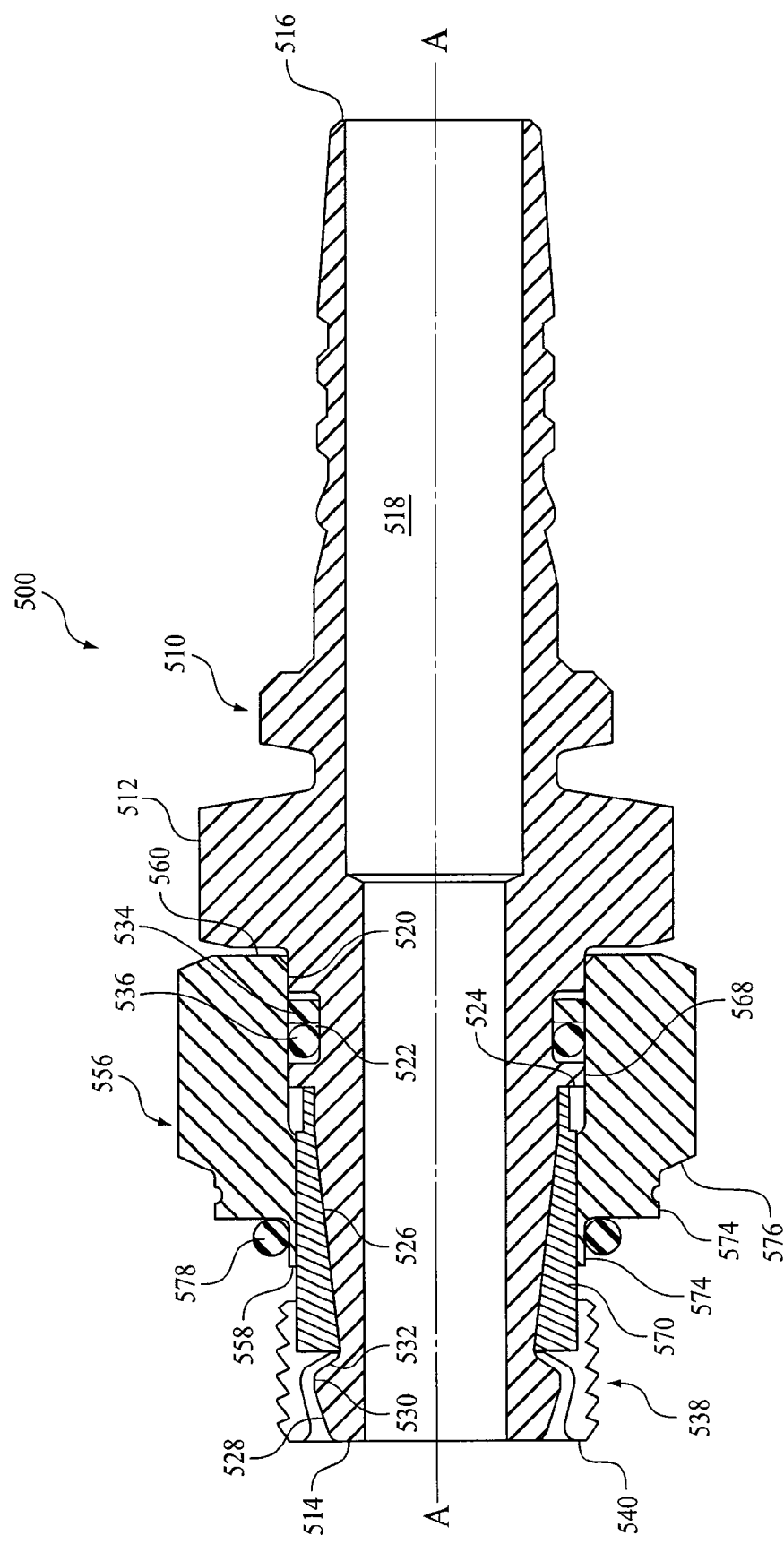

Illustrated in FIGS. 5A and 5B are perspective and cross-sectional views, respectively, of another embodiment of a male coupling 500 configured to be coupled to and separable from a female threaded coupling 12 (not shown) similar to the one discussed above and illustrated in FIG. 1B. Together, the male coupling 500 and the female threaded coupling 12 operate as a push-to-connect type coupling assembly, which will be discussed in further detail below.

In the coupled position, the male coupling member 500 and the female threaded coupling 12 function as a coupling assembly to transmit fluid therethrough. Both the male coupling 500 and the female threaded coupling 12 share the same central longitudinal axis A when they are in the coupled position. In one embodiment, the male coupling 500 can be formed of stainless steel. In alternative embodiments, the male coupling 500 can be formed of other materials such as carbon steel, brass, aluminum, and plastic.

Figure 6A:
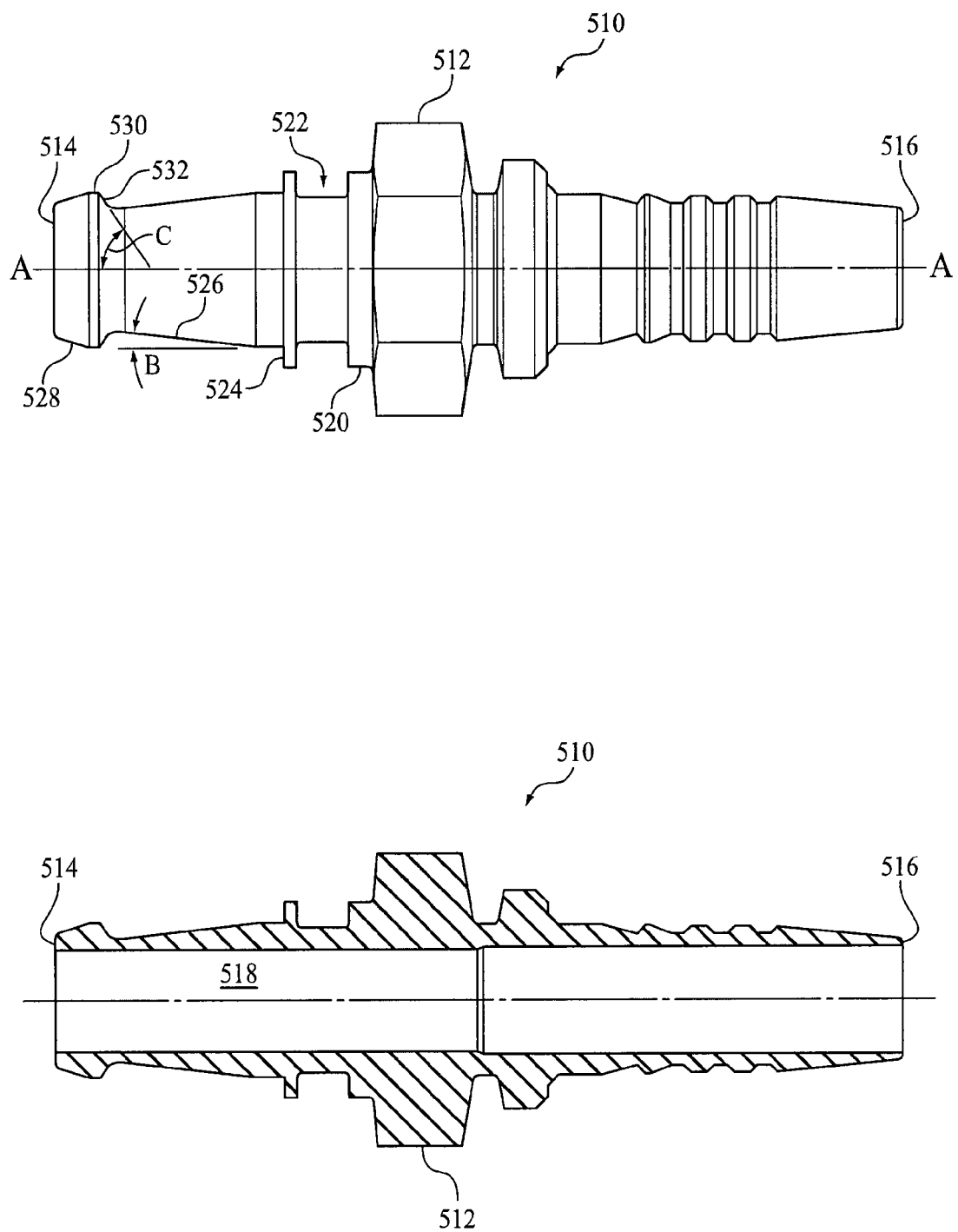
FIG. 6A illustrates top plan, cross-sectional, and end views of one embodiment of a body 510 that is employed in the male coupling 500.

In the illustrated embodiment, the male coupling 500 includes a body 510. As shown in FIG. 6A, the body 510 includes a collar 512 that separates a leading portion having a leading end 514 and a trailing portion having a trailing end 516. Extending through the male coupling member 500 from the leading end 516 to the trailing end 516 is a passageway 518 that permits fluid to flow therethrough. In the illustrated embodiment, the trailing portion of the male coupling 500 includes a hose nipple for receiving a hose. In an alternative embodiment (not shown), the trailing portion may be provided with external threads for attachment to a threaded coupling of another component. The collar 512 includes flats for engagement by a wrench if the trailing portion (not shown) is provided with external threads.

The leading portion of the body 510 includes a first exterior cylindrical surface 520 extending from the collar 512. The first exterior surface 520 includes an outwardly facing annular groove 522 extending radially inward therefrom. Forward of the first exterior surface 520 is a shoulder 524 that extends to a second exterior tapered surface 526, which tapers toward the leading end 514 of the body 510 and is oriented at an angle B relative to the longitudinal axis A. In the illustrated embodiment, the angle B is about 9°. In alternative embodiments (not shown), the angle B can be between about 0° and about 90°.

Extending rearward and outward from the leading end 514 of the body 510 is a ramped surface 528. A third exterior cylindrical surface 530 extends rearward from the ramped surface 528. Extending rearward and inward from the second exterior surface 534 is a second exterior tapered surface 532 that joins the first tapered surface 526 and is oriented at an angle C relative to the longitudinal axis A. In the illustrated embodiment, the angle C is about 40°. In alternative embodiments (not shown), the angle C can be oriented at other angles depending on the design.

As shown in FIG. 5B, a support ring 534, which can be constructed of rigid plastic, leather, or hard rubber, and an annular seal 536, which can be constructed of neoprene or other suitable sealing material, are positioned within the groove 522. The support ring 534 is positioned in the groove 522 between the annular seal 536 and the leading end 516 of the male coupling member 500. The support ring 534 serves to protect the annular seal 536 from damage when the male coupling 500 and the female threaded coupling 512 are used in high-pressure applications. In another embodiment (not shown), the support ring 534 may be eliminated in certain applications, for example, when the male coupling 500 and the female threaded coupling 12 are used in low-pressure applications.

The male coupling 500 further includes a locking member disposed about the leading portion of the body 510. In the illustrated embodiment, the locking member is in the form of a crown-shaped, ratcheting locking member 538 having a forward end 540 and a rearward end 542 that engages the shoulder 528 of the body 510. It will be appreciated that the locking member 346 can take the form of a different shape than crown-shaped depending on the design.

Extending from the forward end 540 of the locking member 538 are a plurality of axial slots 544 that form a plurality of resilient fingers 546, which are joined together adjacent the rearward end 542 of the locking member 538. In the illustrated embodiment, the locking member 538 includes four resilient fingers 546. In alternative embodiments, the locking member can include a different number of slots and resilient fingers. In one embodiment, the locking member 538 is formed of stainless spring steel. In alternative embodiments, the locking member 538 can be formed of other metals such as a spring tempered phosphoric bronze material, carbon steel, or stainless steel.

Each resilient finger 546 of the locking member 538 includes a retaining formation that is configured to mesh with and engage the internal threads 20 of the female threaded coupling 12 when the male coupling 500 is inserted into the female threaded coupling 12, which will be discussed in further detail below. In the illustrated embodiment, the retaining formation includes an external partial threaded formation 548. The threaded formation 548 is characterized as being "partial" due to the fact that the locking member 538 is comprised of resilient fingers 546. Hence, the partial threaded formation 548 of each resilient finger 546 comprises only a portion of a threaded formation. However, it will be appreciated that the resilient fingers 546, together, form a threaded formation, although the threads may not be continuous since adjacent resilient fingers 546 will have a small space in between them.

In the illustrated embodiment, the partial threaded formation 548 includes five trapezoidal-shaped threads 548a-e when viewed in cross-section. However, in alternative embodiments (not shown), the partial threaded formation 548 can include a different number of threads and/or the threads can take the form of other shapes when viewed in cross-section (e.g., triangular, square, or rectangular), so long as they are capable of meshing with and engaging the internal threads 20 of the female threaded coupling 12. Additionally, in alternative embodiments (not shown), the retaining formation can include a plurality of discrete radially outward extending projections or protrusions that are capable of engaging the internal threads 20 of the female threaded port 12. In these embodiments, the plurality of discrete radially outward extending projections or protrusions can take the form of any shape and can be arranged in any pattern, so long as they are capable of engaging the internal threads 20 of the female threaded port 12.

Figure 6B:
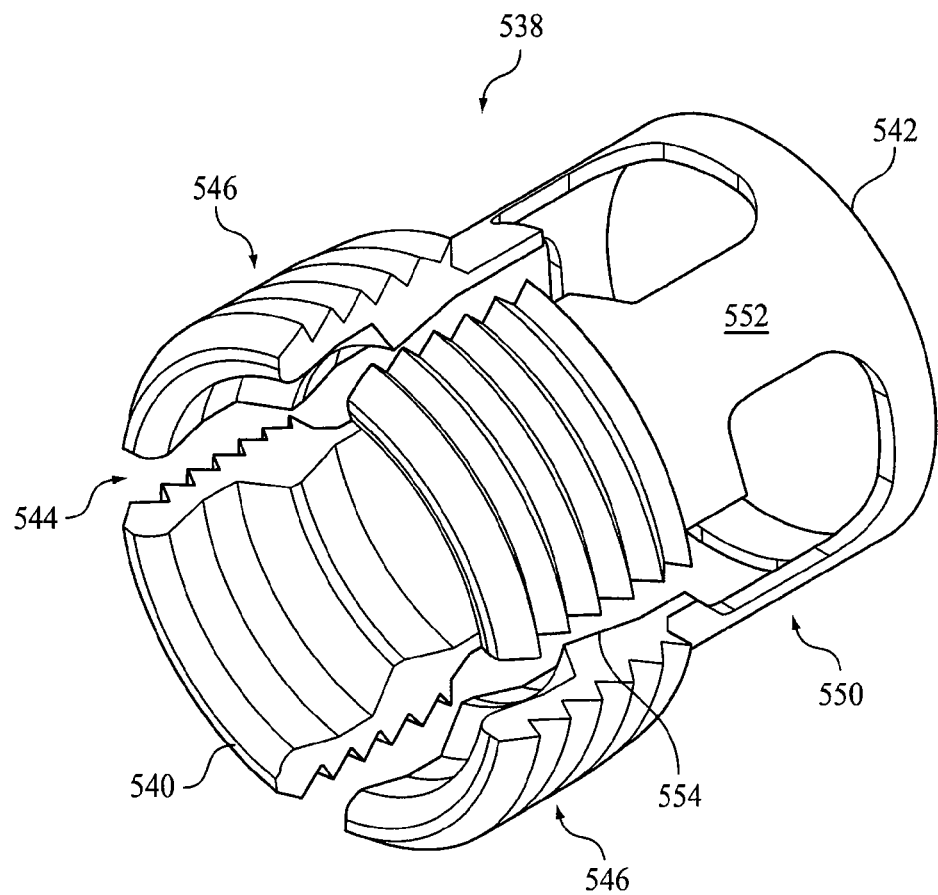
FIG. 6B illustrates perspective and detailed views of one embodiment of a locking member 538 that is employed in the male coupling 500.
Figure 6B:
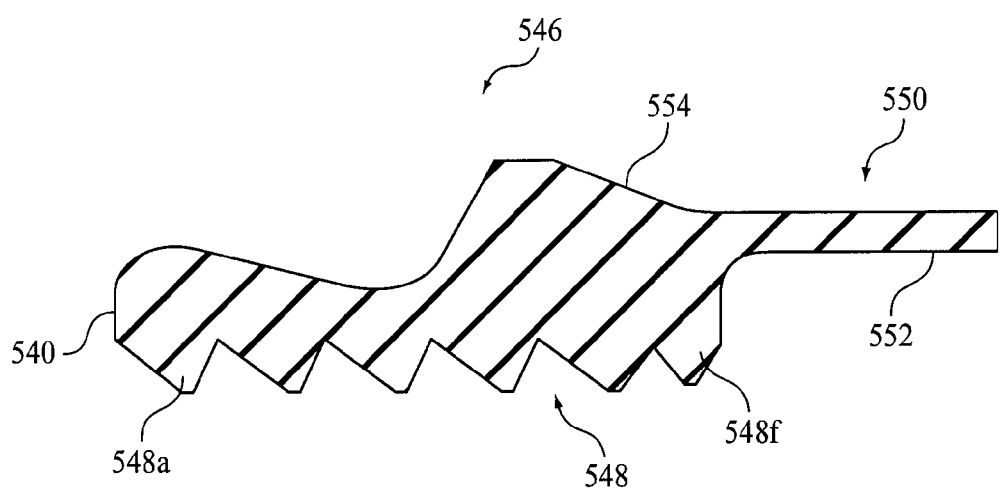

As shown in FIG. 6B, each resilient finger 546 of the locking member 538 also includes a stem portion 550 provided rearward of the partial threaded formation 548. Each stem portion 550 includes an outer surface 552. Opposite the partial threaded formation 548 is an interior tapered surface 554 that tapers outward towards rearward end 542 of the locking member 538.

The resilient fingers 546 are capable of moving between a first position (i.e., a locking position) and a second position (i.e., a releasing position). In the locking position, the threads of the external threaded formation 548 mesh with and engage the internal threads 20 of the female threaded coupling 12 when the male coupling 500 is inserted into the female threaded coupling 12. In the releasing position (not shown), each resilient finger 546 flexes at its base where it joins the other resilient fingers 546, such that the threaded formation 548 of each resilient finger 546 collapses radially inward and the partial threaded formation 548 disengages from the internal threads 20 of the female threaded coupling 12. Due to its resiliency, the finger 546 is capable of returning to the locking position without the need of additional force.

Figure 6C:
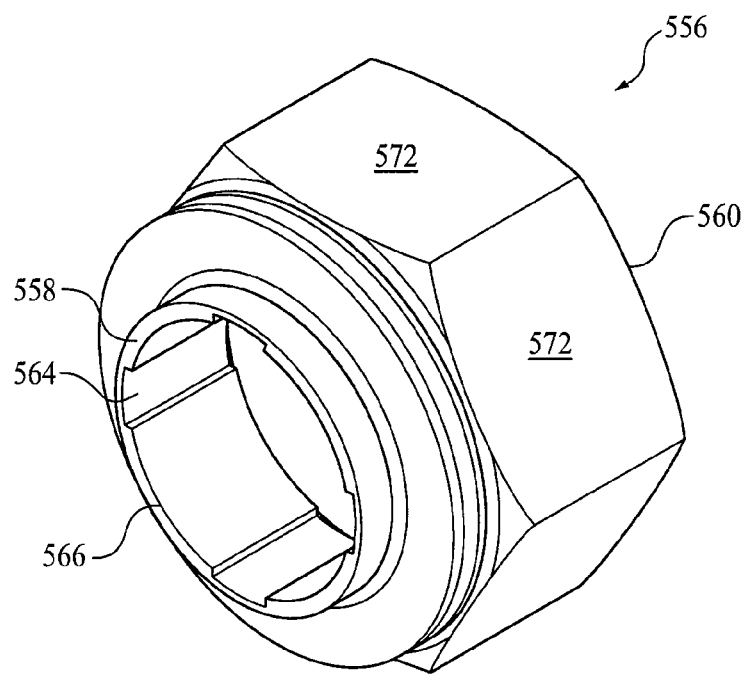
FIG. 6C illustrates perspective and cross-sectional views of one embodiment of a sleeve 556 that is employed in the male coupling 500.
Figure 6C:
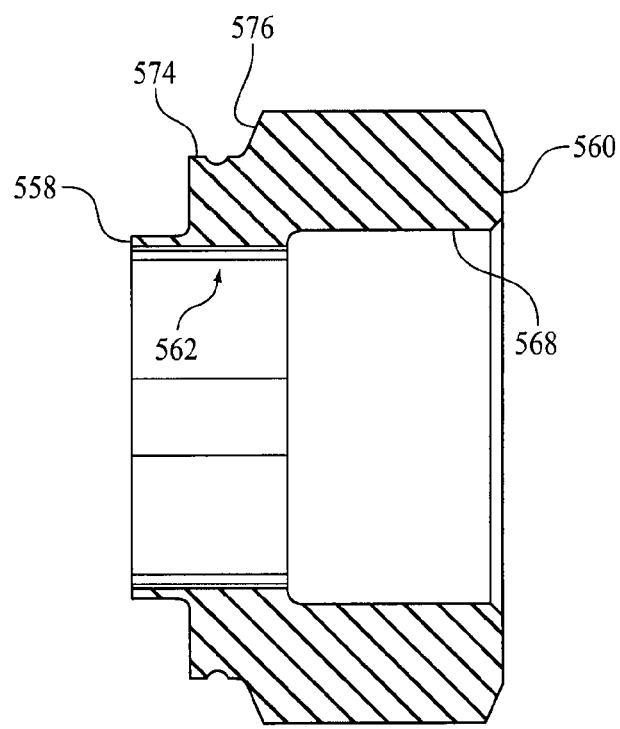

The male coupling 500 further includes an axially movable and rotatable sleeve 556 configured to assist in sealingly connecting the male coupling 500 to the female threaded coupling 12, which will be discussed in more detail below. In the illustrated embodiment, the sleeve 556 is disposed about the leading portion of the body 510 and configured to rotate and move axially relative to the body 510. As shown in FIG. 6C, the sleeve 556 includes a forward end 558 and a rearward end 560. Extending rearward from the forward end 558 of the sleeve 556 is a stepped interior surface 562 having four circumferentially-spaced, inwardly facing grooves 564 that define four circumferentially-spaced ribs 566. The grooves 564 are aligned with the slots in the locking member 538. In alternative embodiments (not shown), the stepped interior surface 562 can include a different number of grooves and ribs.

Extending forward from the rearward end 560 of the sleeve 556 is a second interior cylindrical surface 568, which is sized to receive the first exterior surface 520 of the body 510 and to receive the support ring 534 in the groove 522. The second interior surface 568 is also sized to receive and sealingly engage the annular seal 536 in the groove 522 of the body 510, thereby preventing dust or other contaminants from entering the area forward of the annular seal 536 and keeping the fluid pressure inside the male coupling 500 and the female threaded coupling 12.

With reference back to FIG. 5B, the male coupling 500 further includes a key 570 positioned within each slot 544 of the locking member 538 and each groove 564 of the sleeve 556. The keys 570 serve to couple the locking member 538 to the sleeve 556, such that rotation of the sleeve 556 causes the locking member 538 to rotate. In the illustrated embodiment, four keys 570 are employed. However, a different number of keys 570 can be used in other embodiments.

The sleeve 556 also includes a series of flats 572 for engagement by a wrench, an exterior cylindrical surface 574 extending rearward from the forward end 558 of the sleeve 556, and a shoulder 576 extending radially outward from the outer surface 574. Disposed on the outer surface 574 is an annular seal 578 that is configured to sealingly engage the chamfered surface 18 of the female threaded coupling 12. The annular seal 578 may be constructed of neoprene or other suitable sealing material.

To couple the male coupling 500 to the female threaded coupling 12, the male coupling 500 is moved forward into the female threaded coupling 12 until the forward most partial thread 548a of the partial threaded formation 548 of each resilient finger 546 engages the forward most thread 20a of the female threaded coupling 12. Upon continued forward movement of the male coupling 500, the forward most thread 20a of the female threaded coupling 12 interacts with and forces the resilient finger 546 to flex inward, such that the partial threaded formation 548 of the resilient fingers 546 contracts radially inward. The resilient fingers 546 contract radially inward until they cam or "ratchet" over the apex of the thread 20 of the female threaded coupling 12. As soon as this occurs, the resilient fingers 546 "spring back" to their respective locking positions due to their resiliency, such that the forward most partial thread 548a of the partial threaded formation 540 meshes with and engages the forward most thread 20 of the female threaded coupling 12.

Upon further forward movement of the male coupling 500 into the female threaded coupling 12, the partial threaded formation 548 of each resilient finger 546 cams or "ratchets" along the internal threads 20 of the female threaded coupling 12, by alternating between locking and releasing positions, to progressively mesh with and engage additional internal threads 20 of the female threaded coupling 12.

Once all of the partial threads of the partial threaded formation 548 of the resilient fingers 546 engage the internal threads 20 of the female threaded coupling 12, the male coupling 500 and the female threaded coupling 12 are mechanically coupled to each other. However, the connection is not complete until the male coupling 500 is also sealingly coupled to the female threaded coupling 12. To accomplish this, the sleeve 556 is rotated (e.g., in the clockwise direction) until its shoulder 576 engages the receiving end 14 of the female threaded coupling 12. The nut 355 is then torqued to fully compress the annular seal 578 against the chamfered surface 18 of the female threaded coupling 12 to sealingly couple the male coupling 500 to the female threaded coupling 12. By torquing the sleeve 556, the mechanical connection between the male coupling 500 and the female threaded coupling 12 is also strengthened by drawing the body 510 away from the female threaded coupling 12. This will cause the second tapered surface 532 of the body 510 to engage the interior tapered surface 554 of the locking member 538 and force the resilient fingers 546 radially outward to their locking positions. Also, additional torquing of the sleeve 556 eliminates a gap between the sleeve 556 and the receiving end 14 of the female threaded coupling 12, and prevents extrusion of the annular seal 578 under high pressure. Preferably, the male coupling 500 is designed such that only a ¼ to a ½ turn of the sleeve 556 is required to complete the connection. Once in this position, the male coupling 500 is prevented from being withdrawn from and is sealingly engaged to the female threaded coupling 12. Additionally, the male coupling 500 is prevented from swiveling relative to the female threaded coupling 12.

When it is desired to uncouple the male coupling member 500 from the female threaded coupling 12, the sleeve 556 is rotated in the opposite direction to unthread the male coupling 500 from the female threaded coupling 12.

Although the male coupling 300 is the only embodiment described above and illustrated in the figures that includes a beveled washer 396, it will be appreciated that the other male couplings 10, 500 described above and illustrated in the figures can include a beveled washer provided between the respective annular seal and the sleeve/nut.

Additionally, although the male couplings 10, 300, 500 described above and illustrated in the figures each include a ratcheting locking member that progressively engages the internal threads of the female threaded coupling during the coupling operation, it will be appreciated that the locking member of each male coupling can be configured such that it does not need to progressively engage the internal threads of the female threaded coupling during the coupling operation. In other words, the locking member of each male coupling can be configured such that it does not "ratchet" when the male coupling is inserted into the female threaded coupling.

For example, in the male coupling 300 described above, before inserting the male coupling 300 into the female thread coupling 12, the nut 366 can be moved rearward (e.g., by rotating the nut 366 in the counter-clockwise direction) until the edge 376 of the nut 366 engages the bump 362 on the stem portion 359 of each resilient finger 354 of the locking member 346 and forces the resilient fingers 354 to flex radially inward to their respective releasing positions. With the resilient fingers 354 moved to their respective releasing positions, the male coupling 300 can be inserted into the female threaded coupling 12 without the partial threaded formation 355 engaging any of the internal threads 20 of the female thread coupling 12. Once in the female thread coupling 12, the nut 366 can be moved forward (e.g., by rotating the nut 366 in the clockwise direction) until the edge 376 disengages the bump 362 on the stem portion 359 of each resilient finger 354, thereby permitting the resilient fingers 354 to return to their respective locking positions and engage the internal threads 20 of the female thread coupling 12.

For all of the embodiments discussed above, it will be appreciated that one or more of the cylindrical surfaces discussed above may be replaced with a surface having a linear profile that is angled relative to the longitudinal axis A of the coupling assembly (e.g., a tapered surface) or a curved surface (e.g., a convex or concave surface). Additionally, it will be appreciated that one or more of the tapered or chamfered surfaces discussed above may be replaced with a cylindrical surface or a curved surface (e.g., convex or concave surfaces).

It will be appreciated that the male coupling discussed above has applicability in areas other than fluid connectors. For example, a component that includes the male coupling, particularly the ratcheting locking, can be used as a push-to-connect type fastening device that connects to a female thread in a separate component. In this example, the components need not transport fluid.

Furthermore, it will be appreciated that the locking members discussed above (ratcheting or non-ratcheting) can be modified to be used on a female coupling for connection to a male threaded coupling. For example, the locking member 346 used in the male coupling 300 described above can be modified to include the partial threaded formation 355 on the inner portion of each resilient finger 354, rather than the outer portion, so that the partial threaded formation 355 of each resilient finger 354 can engage the external threads of a male threaded coupling.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A male coupling connectable to and separable from a female threaded coupling, the female threaded coupling including a sealing surface and a receiving portion sized to receive at least a portion of the male coupling, the receiving portion having internal threads provided therein, the male coupling comprising:
    a body having a passageway extending therethrough;
    a locking member disposed about the body and configured to move between locking and releasing positions, the locking member having a retaining formation configured to engage the internal threads of the female threaded coupling when the locking member is in its locking position;
    an axially movable sleeve disposed about the body and having an inner surface that is sized to receive a portion of the locking member; and
    an annular seal disposed about the sleeve,
    wherein, after insertion of the male coupling into the female threaded coupling, the retaining formation of the locking member engages one or more of the internal threads in the female threaded coupling when the locking member is in its locking position,
    wherein, upon movement of the sleeve towards the female threaded coupling, the annular seal is compressed against the sealing surface of the female threaded coupling.

2. The male coupling of claim 1 wherein the locking member includes a ratcheting locking member, wherein upon insertion of the male coupling into the female threaded coupling, the retaining formation of the ratcheting locking member progressively engages the internal threads in the female threaded coupling.

3. The male coupling of claim 2 wherein the ratcheting locking member includes a crown-shaped locking member having a number of slots that define a number of resilient fingers therebetween, the resilient fingers being configured to move between locking and releasing positions, each resilient finger having a partial threaded formation configured to engage the internal threads of the female threaded coupling when the resilient fingers are in their respective locking positions.

4. The male coupling of claim 1 wherein the sleeve is in the form of a threaded nut that is threadingly engaged to external threads on the body.

5. The male coupling of claim 4 further comprising a limited friction element disposed between the nut and the locking member to mechanically link the nut and the locking member together, such that rotation of the nut causes rotation of the locking member.

6. The male coupling of claim 1 further comprising a beveled washer disposed between the annular seal and a shoulder of the sleeve.

7. A male coupling connectable to and separable from a female threaded coupling, the female threaded coupling including a sealing surface and a receiving portion sized to receive at least a portion of the male coupling, the receiving portion having internal threads provided therein, the male coupling comprising:

a body having a passageway extending therethrough;

a ratcheting locking member disposed about the body and configured to move between locking and releasing positions, the ratcheting locking member having a retaining formation configured to engage the internal threads of the female threaded coupling when the locking member is in its locking position;

a movable sleeve disposed about the body and having an inner surface that is sized to receive a portion of the ratcheting locking member; and an annular seal disposed about the sleeve, wherein, upon insertion of the male coupling into the female threaded coupling, the retaining formation of the ratcheting locking member progressively engages the internal threads in the female threaded coupling, wherein, upon axial movement of the sleeve towards the female threaded coupling, the annular seal is compressed against the sealing surface of the female threaded coupling.

8. The male coupling of claim 7 wherein the ratcheting locking member includes a crown-shaped locking member having resilient fingers configured to move between locking and releasing positions, each resilient finger having a partial threaded formation configured to engage the internal threads of the female threaded coupling when the resilient fingers are in their respective locking positions.

9. The male coupling of claim 7 wherein the sleeve is in the form of a threaded nut that is threadingly engaged to external threads on the body, such that rotational movement of the nut translates into axial movement of the nut.

10. The male coupling of claim 9 further comprising an O-ring disposed between the nut and the locking member to mechanically link the nut and the locking member together, such that rotation of the nut causes rotation of the locking member.

11. The male coupling of claim 7 further comprising a beveled washer disposed between the annular seal and a shoulder of the sleeve.

12. A male coupling connectable to and separable from a female threaded coupling, the female threaded coupling including a sealing surface and a receiving portion sized to receive the male coupling, the receiving portion having internal threads provided therein, the male coupling comprising:

a body having external threads and a passageway extending therethrough;

a ratcheting locking member disposed about the body and having a number of resilient fingers configured to move between locking and releasing positions, each resilient finger having a retaining formation configured to engage the internal threads of the female threaded coupling when the resilient fingers are in their respective locking positions; and a nut having internal threads threadingly engaged to the external threads of the body, the nut having an inner surface that is sized to receive a portion of each resilient finger; and an annular seal disposed about the nut, wherein, upon insertion of the male coupling into the female threaded coupling, the retaining formation of each resilient finger progressively engages the internal threads in the female threaded coupling, wherein, upon rotation of the nut, the male coupling is drawn closer to the female threaded coupling, thereby compressing the annular seal against the sealing surface of the female threaded coupling.

13. The male coupling of claim 12 wherein the female threaded coupling is a female threaded port.

14. The male coupling of claim 12 wherein the nut includes an internal edge and/or surface and each resilient finger includes a radially outward protruding bump, such that when the internal edge and/or surface of the nut engages the bump, each resilient finger is forced to move to its releasing position.

15. The male coupling of claim 12 further comprising a limited friction element disposed between the nut and the locking member to mechanically link the nut and the locking member together, such that rotation of the nut causes rotation of the locking member.

16. The male coupling of claim 15 wherein the limited friction element includes an O-ring positioned within an inwardly facing groove in the nut.

17. The male coupling of claim 12 further comprising a bevel washer disposed between the annular seal and a shoulder of the sleeve.

18. A male coupling connectable to and separable from a female threaded coupling, the female threaded coupling having a receiving portion sized to receive the male coupling, the receiving portion having internal threads provided therein, the male coupling comprising:

a body; and a ratcheting locking member disposed about the body and configured to move between locking and releasing positions, the ratcheting locking member having a retaining formation configured to engage the internal threads of the female threaded coupling;

a resilient biasing element providing a radially outward force to bias the ratcheting locking member to its locking position; and a sleeve disposed about the body and in engagement with the ratcheting locking member, such that rotation of the sleeve causes rotation of the ratcheting locking member, wherein, upon insertion of the male coupling into the female threaded coupling, the retaining formation of the ratcheting locking member progressively engages the internal threads in the female threaded coupling, wherein, upon rotation of the sleeve, the ratcheting locking member rotates relative to the body, thereby drawing the male coupling towards the female threaded coupling.

19. The male coupling of claim 18 wherein the ratcheting locking member includes a number of ratcheting locking member segments each of which includes a partial threaded formation.

20. The male coupling of claim 19 wherein each locking member segment includes a key portion and the sleeve includes a spline portion configured to receive the key portion of each locking member segment to mechanically link the locking member segments to the sleeve, such that rotation of the sleeve causes rotation of the locking member segments.

21. A method of sealingly connecting a male coupling to a female threaded coupling, the female threaded coupling including a sealing surface and a receiving portion sized to receive at least a portion of the male coupling, the receiving portion having internal threads provided therein, the method comprising:

providing a male coupling that includes a body having a passageway extending therethrough, a locking member disposed about the body and having a retaining formation configured to engage the internal threads of the female threaded coupling when the locking member is in a locking position, a sleeve disposed about the body, and an annular seal disposed about the sleeve;

inserting the male coupling into the female threaded coupling until the retaining formation of the locking member engages the internal threads in the female threaded coupling; and moving the sleeve towards the female threaded coupling to compress the annular seal against the sealing surface of the female threaded coupling.

22. The method of claim 21, wherein the sleeve includes internal threads that threadingly engage external threads on the body, such that rotation of the sleeve relative to the body permits axial movement of the sleeve towards the female threaded coupling.

23. A male coupling connectable to and separable from a female threaded coupling, the female threaded coupling having a receiving portion sized to receive the male coupling, the receiving portion having internal threads provided therein, the male coupling comprising:
- a body; and
- a ratcheting locking member disposed about the body and configured to move between locking and releasing positions, the ratcheting locking member having a retaining formation configured to engage the internal threads of the female threaded coupling;
- a sleeve disposed about the body and in engagement with the ratcheting locking member, such that rotation of the sleeve causes rotation of the ratcheting locking member; and
- a number of keys to couple the sleeve to the locking member, wherein the sleeve includes splines configured to receive the keys of the locking member to mechanically link the locking member to the sleeve such that rotation of the sleeve causes rotation of the locking member,
- wherein, upon insertion of the male coupling into the female threaded coupling, the retaining formation of the ratcheting locking member progressively engages the internal threads in the female threaded coupling,
- wherein, upon rotation of the sleeve, the ratcheting locking member rotates relative to the body, thereby drawing the male coupling towards the female threaded coupling.

24. The male coupling of claim 23 wherein the ratcheting locking member includes a crown-shaped locking member having a number of slots that define a number of resilient fingers, the resilient fingers being configured to move between locking and releasing positions, each resilient finger having a partial threaded formation configured to engage the internal threads of the female threaded coupling when the resilient fingers are in their respective locking position.

* * * * *